United States Patent
Ouderkirk et al.

(10) Patent No.: US 11,061,233 B2
(45) Date of Patent: *Jul. 13, 2021

(54) POLARIZING BEAM SPLITTER AND ILLUMINATOR INCLUDING SAME

(71) Applicant: 3M INNOVATIVE PROPERTIES COMPANY, St. Paul, MN (US)

(72) Inventors: Andrew J. Ouderkirk, St. Paul, MN (US); Zhisheng Yun, Woodbury, MN (US); Erin A. McDowell, Afton, MN (US); Timothy L. Wong, St. Paul, MN (US); Kandyce M. Bohannon, White Bear Lake, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/737,380

(22) PCT Filed: Jun. 17, 2016

(86) PCT No.: PCT/US2016/038028
§ 371 (c)(1),
(2) Date: Dec. 18, 2017

(87) PCT Pub. No.: WO2017/003719
PCT Pub. Date: Jan. 5, 2017

(65) Prior Publication Data
US 2018/0180980 A1    Jun. 28, 2018

Related U.S. Application Data

(60) Provisional application No. 62/186,944, filed on Jun. 30, 2015.

(51) Int. Cl.
*G02B 27/01*    (2006.01)
*G02B 5/04*    (2006.01)
(Continued)

(52) U.S. Cl.
CPC .......... *G02B 27/0172* (2013.01); *G02B 5/04* (2013.01); *G02B 27/0093* (2013.01);
(Continued)

(58) Field of Classification Search
CPC .............. G02B 27/017; G02B 27/0172; G02B 2027/0178; G02B 27/283; G02B 27/286;
(Continued)

(56) References Cited

U.S. PATENT DOCUMENTS 4,755,043 A    7/1988    Carter
4,891,630 A    1/1990    Friedman
(Continued)

FOREIGN PATENT DOCUMENTS

CA    2754835    4/2013
CN    1479130    3/2004
(Continued)

OTHER PUBLICATIONS

International Search report for PCT International Application No. PCT/US2016/038028 dated Jan. 16, 2017, 7 pages.
(Continued)

*Primary Examiner* — Bao-Luan Q Le
(74) *Attorney, Agent, or Firm* — Clifton F. Richardson

(57) ABSTRACT

A folded light path illuminator is provided. The illuminator may include a polarizing beam splitter having an input face, an output face and an imager face, a light source disposed adjacent the input face and defining an input active area on the input face, and an image forming device disposed adjacent the imager face for receiving light emitted from the light source and emitting a patterned light, which may be a converging patterned light. The image forming device may have a largest image area which defines an output active area on the output face. One or both of the input active area and the output active area may be less than about half the largest
(Continued)

image area. The polarizing beam splitter may include first and second prisms and the volume of the first prism may be no greater than half the volume of the second prism.

27 Claims, 6 Drawing Sheets

(51) Int. Cl.
    *G02B 27/00*          (2006.01)
    *G02B 27/28*          (2006.01)
    *G03B 21/20*          (2006.01)

(52) U.S. Cl.
    CPC ......... *G02B 27/283* (2013.01); *G02B 27/285* (2013.01); *G02B 27/286* (2013.01); *G03B 21/208* (2013.01); *G03B 21/2066* (2013.01); *G03B 21/2073* (2013.01); *G02B 2027/0178* (2013.01)

(58) Field of Classification Search
    CPC ............. G02B 27/285; G02B 27/0093; G03B 21/2033; G03B 21/2066; G03B 21/2073; G03B 21/208
    See application file for complete search history.

(56) References Cited

U.S. PATENT DOCUMENTS

| | | |
|---|---|---|
| 4,894,777 A | 1/1990 | Negishi |
| 5,090,797 A | 2/1992 | Cleveland |
| 5,124,841 A | 6/1992 | Oishi |
| 5,153,752 A | 10/1992 | Kurematsu et al. |
| 5,422,690 A | 6/1995 | Rothberg |
| 5,481,622 A | 1/1996 | Gerhardt |
| 5,526,089 A | 6/1996 | Sato |
| 5,539,578 A | 7/1996 | Togino |
| 5,583,795 A | 12/1996 | Smyth |
| 5,596,451 A | 1/1997 | Handschy |
| 5,617,872 A | 4/1997 | Scinto |
| 5,649,061 A | 7/1997 | Smyth |
| 5,882,774 A | 3/1999 | Jonza |
| 5,889,577 A | 3/1999 | Kohayakawa |
| 5,943,171 A | 8/1999 | Budd |
| 6,036,316 A | 3/2000 | Arita |
| 6,070,098 A | 5/2000 | Moore-Ede |
| 6,082,858 A | 7/2000 | Grace |
| 6,090,051 A | 7/2000 | Marshall |
| 6,116,736 A | 9/2000 | Stark |
| 6,120,467 A | 9/2000 | Schallhorn |
| 6,335,838 B1 | 1/2002 | Kasai et al. |
| 6,346,887 B1 | 2/2002 | Van Orden |
| 6,386,706 B1 | 5/2002 | McClure |
| 6,394,602 B1 | 5/2002 | Morrison |
| 6,540,663 B1 | 4/2003 | Vau |
| 6,542,307 B2* | 4/2003 | Gleckman .......... G02B 27/0172 359/627 |
| 6,572,562 B2 | 6/2003 | Marshall |
| 6,575,902 B1 | 6/2003 | Burton |
| 6,580,448 B1 | 6/2003 | Stuttler |
| 6,607,484 B2 | 8/2003 | Suzuki |
| 6,609,795 B2 | 8/2003 | Weber |
| 6,634,749 B1 | 10/2003 | Morrison |
| 6,702,809 B1 | 3/2004 | Knopp |
| 6,719,426 B2 | 4/2004 | Magarill |
| 6,820,979 B1 | 11/2004 | Stark |
| 6,847,336 B1 | 1/2005 | Lemelson |
| 7,206,134 B2* | 4/2007 | Weissman .............. G02B 23/14 345/8 |
| 7,226,164 B2 | 6/2007 | Abourizk |
| 7,255,441 B1 | 8/2007 | Koami |
| 7,347,551 B2 | 3/2008 | Fergason |
| 7,350,928 B2* | 4/2008 | Liao ....................... G03B 21/28 348/759 |
| 7,450,016 B2 | 11/2008 | Isaji |
| 7,460,940 B2 | 12/2008 | Larsson |
| 7,480,396 B2 | 1/2009 | Teiwes |
| 7,503,654 B2 | 3/2009 | Nakagawa |
| 7,533,988 B2 | 5/2009 | Ebisawa |
| 7,543,938 B2 | 6/2009 | Nakada |
| 7,545,571 B2 | 6/2009 | Garoutte |
| 7,589,902 B2 | 9/2009 | Garoutte |
| 7,614,745 B2 | 11/2009 | Waldorf |
| 7,625,087 B2 | 12/2009 | Taylor |
| 7,697,032 B2 | 4/2010 | Kim |
| 7,744,216 B1 | 6/2010 | Uhlhorn |
| 7,750,286 B2* | 7/2010 | Ryf ..................... H04M 1/0272 250/208.1 |
| 7,891,814 B2 | 2/2011 | Harada |
| 7,901,083 B2* | 3/2011 | Destain .............. G02B 13/0015 349/5 |
| 7,959,578 B2 | 6/2011 | Lonky |
| 8,066,375 B2 | 11/2011 | Skogo |
| 8,070,295 B2* | 12/2011 | Destain .............. G02B 13/0015 349/5 |
| 8,100,532 B2 | 1/2012 | Yoo |
| 8,104,898 B2* | 1/2012 | Liao .................... G03B 21/2066 353/20 |
| 8,265,743 B2 | 9/2012 | Aguilar |
| 8,272,742 B2* | 9/2012 | Yamamoto ............. G03B 21/28 353/20 |
| 8,358,337 B2 | 1/2013 | Ebisawa |
| 8,459,800 B2* | 6/2013 | Destain .............. G02B 13/0015 349/5 |
| 8,477,996 B2 | 7/2013 | Zschau |
| 8,511,827 B2* | 8/2013 | Hua ........................ G02B 13/22 353/20 |
| 8,610,768 B2 | 12/2013 | Holmberg |
| 8,644,384 B2 | 2/2014 | Tian |
| 8,899,752 B2 | 12/2014 | Kato |
| 8,964,298 B2* | 2/2015 | Haddick ................. G06F 3/013 359/630 |
| 9,310,591 B2* | 4/2016 | Hua ........................ G02B 13/22 |
| 9,341,960 B2 | 5/2016 | Van Dijsseldonk |
| 9,756,300 B2* | 9/2017 | Sheng ................... H04N 9/3173 |
| 10,214,553 B2 | 12/2019 | Ouderkirk et al. |
| 2001/0013972 A1 | 8/2001 | Doany |
| 2001/0028309 A1 | 11/2001 | Torch |
| 2002/0015116 A1 | 2/2002 | Park |
| 2002/0063818 A1 | 5/2002 | Anderson |
| 2002/0118339 A1 | 8/2002 | Lowe |
| 2002/0188219 A1 | 12/2002 | Suchard |
| 2002/0191297 A1* | 12/2002 | Gleckman .......... G02B 27/0172 359/629 |
| 2003/0072079 A1 | 4/2003 | Silverstein |
| 2004/0042637 A1 | 3/2004 | Beale |
| 2004/0181168 A1 | 9/2004 | Plant |
| 2004/0233393 A1 | 11/2004 | Magarill |
| 2005/0024586 A1 | 2/2005 | Teiwes |
| 2005/0259224 A1* | 11/2005 | Lee ....................... H04N 9/3114 353/31 |
| 2005/0286135 A1* | 12/2005 | Weissman .............. G02B 23/14 359/630 |
| 2006/0004266 A1 | 1/2006 | Shirai |
| 2006/0077581 A1 | 4/2006 | Schwiegerling |
| 2006/0098293 A1 | 5/2006 | Garoutte |
| 2006/0103812 A1* | 5/2006 | Liao ....................... G03B 21/28 353/81 |
| 2007/0123794 A1 | 5/2007 | Togino |
| 2007/0265507 A1 | 11/2007 | De Lemos |
| 2007/0273611 A1 | 11/2007 | Torch |
| 2008/0013051 A1 | 1/2008 | Glinski et al. |
| 2008/0013185 A1 | 1/2008 | Garoutte |
| 2008/0049190 A1* | 2/2008 | Destain .............. G02B 13/0015 353/20 |
| 2008/0107361 A1 | 5/2008 | Asukai |
| 2008/0192202 A1 | 8/2008 | Lewkowski |
| 2008/0198330 A1 | 8/2008 | Taylor |
| 2008/0255949 A1 | 10/2008 | Genco |
| 2008/0309616 A1 | 12/2008 | Massengill |
| 2009/0009719 A1* | 1/2009 | Ryf ..................... H04M 1/0272 353/20 |

(56) References Cited

U.S. PATENT DOCUMENTS

| | | |
|---|---|---|
| 2009/0012419 A1 | 1/2009 | McKee |
| 2009/0036755 A1 | 2/2009 | Pradeep |
| 2009/0082692 A1 | 3/2009 | Hale |
| 2009/0171240 A1 | 7/2009 | Aguilar |
| 2009/0190101 A1* | 7/2009 | Alasaarela ............... G02B 5/04 353/81 |
| 2009/0209829 A1 | 8/2009 | Yanagidaira |
| 2010/0091247 A1* | 4/2010 | Yamamoto ............ G03B 21/28 353/20 |
| 2010/0185113 A1 | 7/2010 | Peot |
| 2010/0195056 A1 | 8/2010 | Yoo |
| 2010/0216104 A1 | 8/2010 | Reichow |
| 2010/0324454 A1 | 12/2010 | Kircher |
| 2011/0013007 A1 | 1/2011 | Holmberg |
| 2011/0037951 A1* | 2/2011 | Hua ....................... G02B 13/22 353/20 |
| 2011/0077546 A1 | 3/2011 | Fabian |
| 2011/0122371 A1* | 5/2011 | Destain ............. G02B 13/0015 353/20 |
| 2011/0164227 A1* | 7/2011 | Kim ..................... H04N 9/3114 353/98 |
| 2011/0279666 A1 | 11/2011 | Strombom |
| 2012/0050144 A1 | 3/2012 | Morlock |
| 2012/0229661 A1 | 9/2012 | Sekiguchi |
| 2012/0230547 A1 | 9/2012 | Durnell |
| 2012/0268720 A1* | 10/2012 | Wang ....................... G02B 5/04 353/81 |
| 2012/0287406 A1* | 11/2012 | Destain ............. G02B 13/0015 353/20 |
| 2013/0010097 A1 | 1/2013 | Durnell |
| 2013/0012790 A1 | 1/2013 | Horseman |
| 2013/0013327 A1 | 1/2013 | Horseman |
| 2013/0057786 A1* | 3/2013 | Watson ............. G03B 21/2033 349/5 |
| 2013/0063701 A1* | 3/2013 | Ouderkirk .......... G03B 21/2033 353/20 |
| 2013/0090562 A1 | 4/2013 | Ryan |
| 2013/0096397 A1 | 4/2013 | Kiso |
| 2013/0169523 A1 | 4/2013 | Huang |
| 2013/0127980 A1* | 5/2013 | Haddick ................. G06F 3/013 348/14.08 |
| 2013/0128364 A1 | 5/2013 | Wheeler |
| 2013/0188843 A1 | 7/2013 | Schimtt-Manderbach |
| 2013/0208234 A1 | 8/2013 | Lewis |
| 2013/0215374 A1 | 8/2013 | Blum |
| 2013/0250243 A1 | 9/2013 | Cech |
| 2013/0250415 A1 | 9/2013 | Gupta |
| 2013/0308099 A1 | 9/2013 | Stack |
| 2013/0281798 A1 | 10/2013 | Rau |
| 2013/0293844 A1 | 11/2013 | Gross |
| 2013/0329304 A1* | 12/2013 | Hua ....................... G02B 13/22 359/663 |
| 2013/0332160 A1 | 12/2013 | Posa |
| 2013/0336547 A1 | 12/2013 | Komogortsev |
| 2014/0046193 A1 | 2/2014 | Stack |
| 2014/0055749 A1 | 2/2014 | Zhou |
| 2014/0071400 A1 | 3/2014 | Gao |
| 2014/0081117 A1 | 3/2014 | Kato |
| 2014/0135590 A1 | 5/2014 | Pedro |
| 2014/0148728 A1 | 5/2014 | Eizenman |
| 2014/0154651 A1 | 6/2014 | Stack |
| 2014/0160432 A1 | 6/2014 | Brown, Jr. |
| 2014/0160433 A1 | 6/2014 | Brown, Jr. |
| 2014/0160434 A1 | 6/2014 | Brown, Jr. |
| 2014/0163329 A1 | 6/2014 | Brown, Jr. |
| 2014/0163335 A1 | 6/2014 | Horseman |
| 2014/0176818 A1* | 6/2014 | Watson ................ G02B 27/283 349/9 |
| 2014/0187322 A1 | 7/2014 | Luchinskiy |
| 2014/0211173 A1* | 7/2014 | Destain .................. G03B 21/16 353/52 |
| 2014/0240613 A1 | 8/2014 | Bohn |
| 2014/0240675 A1 | 8/2014 | Narsimha Iyer |
| 2014/0253876 A1 | 9/2014 | Klin |
| 2014/0268055 A1 | 9/2014 | Skogo |
| 2014/0330159 A1 | 11/2014 | Costa |
| 2014/0336525 A1 | 11/2014 | Cinberg |
| 2015/0219896 A1 | 8/2015 | Ouderkirk et al. |
| 2019/0004327 A1 | 1/2019 | Ouderkirk et al. |

FOREIGN PATENT DOCUMENTS

| | | |
|---|---|---|
| DE | 4330265 | 3/1994 |
| DE | 19859086 | 6/2000 |
| EP | 1127534 | 8/2001 |
| EP | 1289406 | 3/2003 |
| EP | 2060231 | 5/2009 |
| EP | 2712541 | 4/2014 |
| EP | 2805671 | 11/2014 |
| ES | 2308939 | 12/2008 |
| FR | 2888742 | 1/2007 |
| GB | 1175945 | 1/1970 |
| GB | 2454916 | 5/2009 |
| JP | H05-181014 | 12/1991 |
| JP | H06-059124 | 3/1994 |
| JP | H10-170706 | 6/1998 |
| JP | 2001-166252 | 6/2001 |
| JP | 2003-121793 | 4/2003 |
| JP | 2009-150974 | 7/2009 |
| JP | 2009-180792 | 8/2009 |
| JP | 2009-265140 | 11/2009 |
| JP | 2011175126 | 9/2011 |
| WO | WO 1994-018883 | 9/1994 |
| WO | WO 1995-033402 | 12/1995 |
| WO | WO 2002-099507 | 12/2002 |
| WO | WO 2003-075076 | 9/2003 |
| WO | WO 2006-011870 | 2/2006 |
| WO | WO 2006-091893 | 8/2006 |
| WO | WO 2006-096135 | 9/2006 |
| WO | WO 2009-018582 | 2/2009 |
| WO | WO 2009-115073 | 9/2009 |
| WO | WO 2009-121088 | 10/2009 |
| WO | WO 2011-144932 | 11/2011 |
| WO | WO 2012-039895 | 3/2012 |
| WO | WO 2013-078462 | 5/2013 |
| WO | WO 2013-101143 | 7/2013 |
| WO | WO 2013-102768 | 7/2013 |
| WO | WO 2013-112705 | 8/2013 |
| WO | WO 2013-132165 | 9/2013 |
| WO | WO 2013-159841 | 10/2013 |
| WO | WO 2014-043142 | 3/2014 |
| WO | WO 2014-093085 | 6/2014 |
| WO | WO 2014-093448 | 6/2014 |
| WO | WO 2014093085 A1 * | 6/2014 ......... G02B 27/0961 |
| WO | WO 2014-164453 | 10/2014 |
| WO | WO 2015-034801 | 3/2015 |
| WO | WO 2015-157016 | 10/2015 |

OTHER PUBLICATIONS

Office Action dated Apr. 30, 2019 in U.S. Appl. No. 15/737,445, 19 pages.
Examiner-Initiated Interview Summary dated Aug. 21, 2019 in U.S. Appl. No. 15/737,445, 3 pages.
Ouderkirk, U.S. Appl. No. 16/688,223 filed Nov. 19, 2019, Polarizing Beam Splitting System.
Non-final Office Action dated Feb. 10, 2021 in U.S. Appl. No. 16/688,223.

\* cited by examiner

POLARIZING BEAM SPLITTER AND ILLUMINATOR INCLUDING SAME

BACKGROUND

Projection systems may include a light source and a polarization-rotating image-forming device which operates by rotating the polarization of light provided by the light source to produce an image. A polarizing beam splitter may be included to separate light having orthogonal polarization states.

SUMMARY

In some aspects of the present description, an illuminator including a polarizing beam splitter, a light source and an image forming device is provided. The polarizing beam splitter includes a first prism having an input face, an output face and a first hypotenuse; a second prism having an imager face and a second hypotenuse, the second hypotenuse disposed adjacent the first hypotenuse; and a reflective polarizer disposed between the first hypotenuse and the second hypotenuse. The light source is disposed adjacent the input face and defines an input active area on the input face. The image forming device is disposed adjacent the imager face for receiving light emitted from the light source and emitting a patterned light. The image forming device has a largest image area which defines an output active area on the output face. One or both of the input active area and the output active area are less than about half the largest image area.

In some aspects of the present description, an illuminator including a polarizing beam splitter, a first reflective component disposed adjacent a first surface of the polarizing beam splitter, and a lens disposed adjacent a second surface of the polarizing beam splitter opposite the first surface is provided. The first reflective component has a largest active area and the lens receives light emitted by the first reflective component. The largest active area defines a largest acceptance area of the lens which is no greater than about half the largest active area.

In some aspects of the present description, an illuminator including a light source, a reflective polarizer in optical communication with the light source, and a lens in optical communication with the reflective polarizer is provided. The reflective polarizer defines a smallest imaginary rectangular parallelepiped entirely containing the reflective polarizer and having a surface perpendicular to a central light ray emitted by the light source. At least a portion of the light source or at least a portion of the lens is disposed inside the imaginary rectangular parallelepiped.

In some aspects of the present description, a polarizing beam splitter including a reflective polarizer, a first prism having a first volume, and a second prism having a second volume is provided. The first volume is no greater than about half the second volume. The first prism includes a first face, a second face adjacent the first face with an angle between the first and second faces substantially equal to 90 degrees, and a first hypotenuse opposite the angle. The second prism includes third and fourth faces and a second hypotenuse. The second hypotenuse is disposed adjacent the first hypotenuse and the first the first and second hypotenuses have substantially equal surface areas. The third face is opposite the first face and substantially parallel with the first face, and the fourth face is opposite the second face and substantially parallel with the second face. The reflective polarizer is disposed between the first and second hypotenuses.

In some aspects of the present description, a polarizing beam splitting system adapted to receive light from a light source and centered on a folded optical axis defined by an optical path of a central light ray emitted by the light source is provided. The polarizing beam splitting system includes an input surface substantially perpendicular to the optical axis, a reflective polarizer, a second reflective component substantially perpendicular to the optical axis, and an output face substantially perpendicular to the optical axis. Light enters the polarizing beam splitting system by passing through the input surface and exits the polarizing beam splitting system by passing through the output surface. The optical axis has a length d1 between the input surface and the reflective polarizer, a length d2 between the first reflective component and the reflective polarizer, a length d3 between the second reflective component and the reflective polarizer, and a length d4 between the output surface and the reflective polarizer. One or both of d1 and d4 are less than a lesser of d2 and d3.

In some aspects of the present description, a polarizing beam splitting system adapted to receive light from a light source and centered on a folded optical axis defined by an optical path of a central light ray emitted by the light source is provided. The polarizing beam splitting system includes an input surface substantially perpendicular to the optical axis, a reflective polarizer having a largest lateral dimension d5, a first reflective component substantially perpendicular to the optical axis, a second reflective component substantially perpendicular to the optical axis, and an output face substantially perpendicular to the optical axis. The light enters the polarizing beam splitting system by passing through the input surface and exits the polarizing beam splitting system by passing through the output surface. The optical axis has a length d1 between the input surface and the reflective polarizer, a length d2 between the first reflective component and the reflective polarizer, a length d3 between the second reflective component and the reflective polarizer, and a length d4 between the output surface and the reflective polarizer. One or both of d1 and d4 are less than d5/4.

In some aspects of the present description, an illuminator comprising a light source, a lens, and a polarizing beam splitting system adapted to receive light from the light source and output light through the lens is provided. The polarizing beam splitting system is centered on a folded optical axis defined by an optical path of a central light ray emitted by the light source. The polarizing beam splitting system includes a reflective polarizer, a first reflective component substantially perpendicular to the optical axis and disposed proximate the reflective polarizer opposite the light source, and a second reflective component substantially perpendicular to the optical axis and disposed proximate the reflective polarizer opposite the lens. The optical axis has a length d1 between the light source and the reflective polarizer, a length d2 between the first reflective component and the reflective polarizer, a length d3 between the second reflective component and the reflective polarizer, and a length d4 between the lens and the reflective polarizer. One or both of d1 and d4 are less than a lesser of d2 and d3.

In some aspects of the present description, an illuminator including a light source, a lens, and a polarizing beam splitting system adapted to receive light from the light source and output light through the lens is provided. The polarizing beam splitting system is centered on a folded optical axis defined by an optical path of a central light ray emitted by the light source. The polarizing beam splitting system includes a reflective polarizer having a largest lateral dimension d5, a first reflective component substantially perpendicular to the optical axis and disposed proximate the reflective polarizer opposite the light source, a second reflective component substantially perpendicular to the optical axis and disposed proximate the reflective polarizer opposite the lens. The optical axis has a length d1 between the light source and the reflective polarizer, a length d2 between the first reflective component and the reflective polarizer, a length d3 between the second reflective component and the reflective polarizer, and a length d4 between the lens and the reflective polarizer. One or both of d1 and d4 are less than d5/4.

In some aspects of the present description, an illuminator including a light source, a reflective polarizer, a first reflective component, a second reflective component and a lens is provided. The illuminator is configured such that a central light ray emitted by the light source sequentially passes through the reflective polarizer, reflects from the first reflective component back toward the reflective polarizer, reflects from the reflective polarizer towards the second reflective component, reflects from the second reflective component back towards the reflective polarizer, passes through the reflective polarizer, and then exits the illuminator through the lens.

In some aspects of the present description, a polarizing beam splitting system including a reflective polarizer and having a folded optical axis defined by an optical path of a central light ray emitted by a light source towards the reflective polarizer is provided. The folded optical axis includes overlapping first and second segments and overlapping third and fourth segments. The optical path along the first segment has a first direction and the optical path along the second segment has a second direction opposite to the first direction. The optical path along the third segment has a third direction and the optical path along the fourth segment has a fourth direction opposite to the third direction. The first direction and the third direction are substantially orthogonal.

In some aspects of the present description, a method of projecting an image is provided. The method includes directing light to a reflective component through a polarizing beam splitter, reflecting at least some of the light back towards the polarizing beam splitter, reflecting at least some of the light from the polarizing beam splitter towards an image forming device, and reflecting at least some of the light from the image forming device as a converging patterned light.

In some aspects of the present description, a method of projecting an image is provided. The method includes directing a light beam through a folded light path illuminator onto an imaging forming device, and reflecting a converging patterned light from the image forming device.

DETAILED DESCRIPTION

In the following description, reference is made to the accompanying drawings that forms a part hereof and in which various embodiments are shown by way of illustration. The drawings are not necessarily to scale. It is to be understood that other embodiments are contemplated and may be made without departing from the scope or spirit of the present disclosure. The following detailed description, therefore, is not to be taken in a limiting sense.

It is sometimes desired for a projection system to be compact. For example, hand-held pico-projectors and head mounted displays typically utilize compact projection systems. Such compact projectors may include a light source, a polarizing beam splitter, and a polarization-rotating image-forming device which operates by rotating the polarization of light provided by the light source to produce an image. The polarizing beam splitter often includes a reflective polarizer disposed between two right triangular prisms. Both prisms typically have the same volume and the polarizing beam splitter typically has opposing faces having the same area. According to the present description, illuminators are provided which can be more compact than traditional illuminators and which may be suitable for use in a projection system, for example. The illuminators may include a polarizing beam splitter having first and second prisms having differing geometries. For example the first prism may have a volume substantially smaller than the second prism and/or may have faces having areas substantially smaller than corresponding areas of faces the second prism. Illuminators of the present description may allow a lens and/or a light source to be placed closer to the reflective polarizer than in traditional systems thereby achieving a more compact design. In some embodiments, the compact design may be achieved by utilizing a folded light path illuminator which provides a converging patterned light from an image forming device to a lens.

Figure 1:
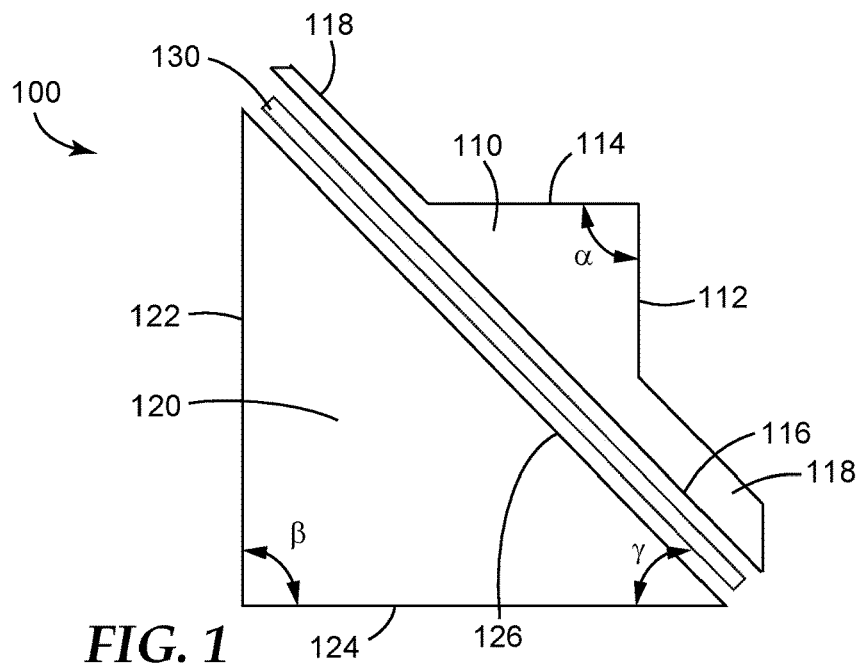
FIG. 1 is a side view of a polarizing beam splitter.

FIG. 1 is a schematic side view of polarizing beam splitter 100 including first prism 110, second prism 120, and reflective polarizer 130. First prism 110 includes first face 112, second face 114, first hypotenuse 116 and a portion 118 extending from the first and second faces 112 and 114. The first hypotenuse comprises a major surface of the portion 118. Second prism 120 includes third face 122, fourth face 124 and second hypotenuse 126. The second hypotenuse 126 is disposed adjacent the first hypotenuse 116 and the reflective polarizer 130 is disposed between the first hypotenuse 116 and the second hypotenuse 126. The polarizing beam splitter 100 may be part of a polarizing beam splitting system that includes the polarizing beam splitter 100 and that may include one or more additional optical components, such as one or more reflective components, for example. The polarizing beam splitter 100 may be part of an illuminator that includes the polarizing beam splitter 100 and that may include one or more additional optical components, such as a light source and/or an image forming device, for example. When used in an illuminator, first face 112 may be an input face disposed to receive light from a light source, second face 114 may be an output face, and fourth face 124 may be an imager face disposed adjacent an image forming device. In other embodiments, when used in an illuminator, third face 122 may be an input face disposed to receive light from a light source, second face 114 may be an output face, and fourth face 124 may be an imager face disposed adjacent an image forming device.

The second face 114 is adjacent the first face 112 with an angle α between the first and second faces 112 and 114. The angle α may be between 80 and 100 degrees, for example, or may be equal to or substantially equal to 90 degrees. The fourth face 124 is adjacent the third face 122 with an angle β between the third and fourth faces 122 and 124. The angle β may be between 80 and 100 degrees, for example, or may be equal to or substantially equal to 90 degrees. In some embodiments, the third face 122 is opposite the first face 112 and substantially parallel with the first face 112. In some embodiments, the fourth face 124 is opposite the second face 114 and substantially parallel with the second face 114. In some embodiments, the second prism 120 is substantially a right triangular prism. In some embodiments, the first the first and second hypotenuses 116 and 126 have substantially equal surface areas.

An angle γ between the reflective polarizer and the fourth face 124 may be in a range of about 30 degrees, or about 40 degrees, to about 50 degrees, or to about 60 degrees, for example. As described elsewhere herein, an illuminator that includes the polarizing beam splitter 100 may have a folded optical axis having a segment substantially parallel with fourth face 124 and may have another segment substantially perpendicular to fourth face 124. An angle between the optical axis and the reflective polarizer may be equal to the angle γ or equal to 90 degrees minus γ. In some embodiments, an angle between the reflective polarizer and the optical axis is between about 40 degrees and about 60 degrees.

In some embodiments, the first prism 110 has a first volume, the second prism 120 has a second volume, and the first volume is no greater than about half the second volume. In some embodiments, the first volume is less than 35 percent, or less than 40 percent, or less than 50 percent, or less than 60 percent of the second volume.

In some embodiments, the first face 112 has a largest area (the total area of first face 112) that is less than about half of a largest area of the third face 122 (the total area of third face 122) and/or that is less than about half of a largest area of the fourth face 124 (the total area of fourth face 124). In some embodiments, the largest area of first face 112 is less than 60 percent, or less than 50 percent, or less than 40 percent, or less than 35 percent of the largest area of third face 122. In some embodiments, the largest area of first face 112 is less than 60 percent, or less than 50 percent, or less than 40 percent, or less than 35 percent of the largest area of fourth face 124. In some embodiments, the second face 114 has a largest area (the total area of second face 114) that is less than about half of a largest area of the third face 122 (the total area of third face 122) and/or that is less than about half of a largest area of the fourth face 124 (the total area of fourth face 124). In some embodiments, the largest area of second face 114 is less than 60 percent, or less than 50 percent, or less than 40 percent, or less than 35 percent of the largest area of third face 122. In some embodiments, the largest area of second face 114 is less than 60 percent, or less than 50 percent, or less than 40 percent, or less than 35 percent of the largest area of fourth face 124. In some embodiments, each of the largest area of the first face 112 and the largest area of the second face 114 is less than about half of a lesser of a largest area of the third face 122 and the largest area of the fourth face 124.

The prisms and the reflective polarizer in FIG. 1 are shown spaced apart for clarity of illustration. However, it should be understood that the various components could be in direct contact or attached through an optically clear adhesive, for example. In some embodiments, the reflective polarizer 130 is bonded to one or both of the first and second prisms 110 and 120 through optically clear adhesive(s).

Reflective polarizer 130 may be any suitable type of reflective polarizer such as, for example, a polymeric multilayer reflective polarizer, a wire grid polarizer, a MacNeille reflective polarizer, or a cholesteric reflective polarizer. Suitable polymeric multilayer reflective polarizers are described, for example, in U.S. Pat. No. 5,882,774 (Jonza et al.), and U.S. Pat. No. 6,609,795 (Weber et al.) and include Advanced Polarizing Film (APF) available from 3M Company (St. Paul, Minn.).

The first and second prisms 110 and 120 may be made from any suitable materials such as, for example, glass, ceramics or optical plastics (e.g., polycarbonate, acrylates such as polymethylmethacrylate (PMMA), cyclic olefins, or other polymers). The first and second prisms can be made by any suitable process such as, for example, molding, machining, grinding and/or polishing. The material selected may have a low birefringence so that the polarization state is not significantly altered as light passes through the first or second prisms 110 and 120. In some embodiments, no more than about 5 percent, or 3 percent, or 2 percent, or 1 percent of light having a polarization along a block axis of the reflective polarizer 130 is transmitted through the polarizing beam splitter 100. In some embodiments, the combined reflectance of the reflective polarizer 130 bonded to first and second prisms 110 and 120 is less than 5 percent, or less than 3 percent, or less than 2 percent, or less than 1 percent for light polarized along a pass axis for the reflective polarizer 130.

Figure 2:
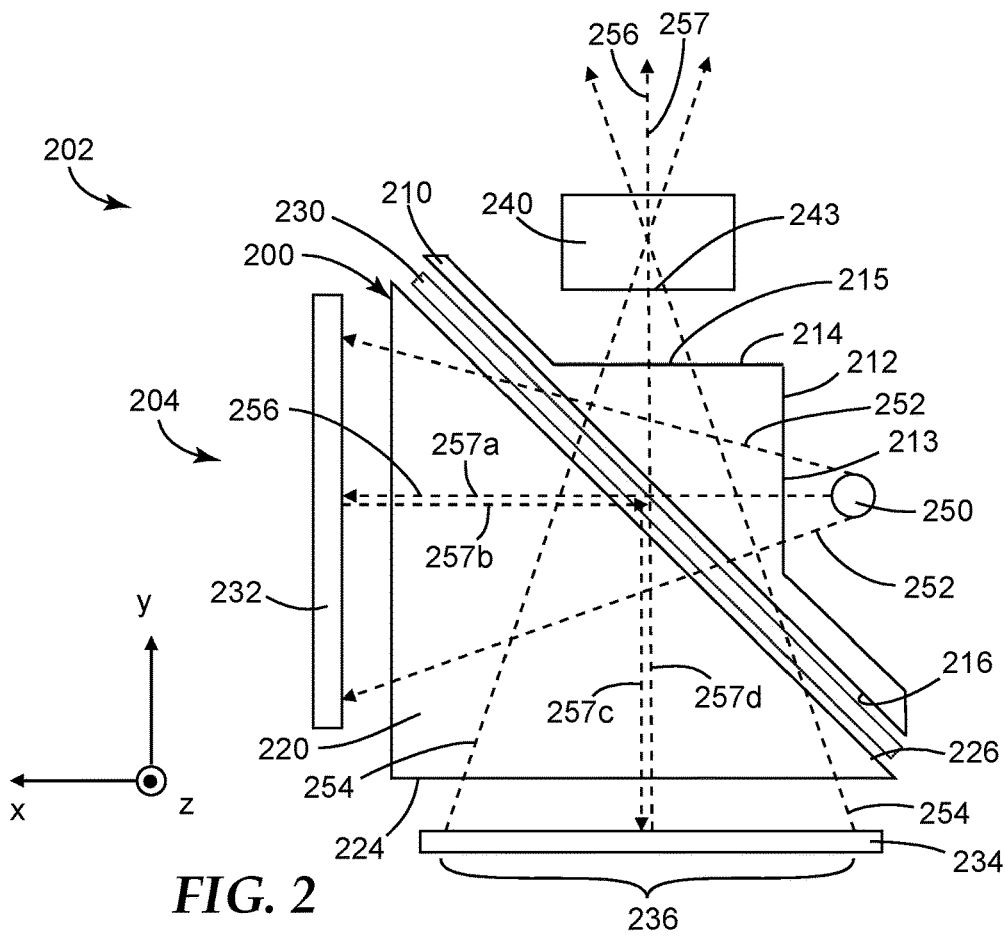
FIG. 2 is a side view of an illuminator.

FIG. 2 is a schematic side view of illuminator 202 including polarizing beam splitting system 204, which includes polarizing beam splitter 200 and first and second reflective components 232 and 234. Illuminator 202 further includes a lens 240 and a light source 250. Polarizing beam splitter 200, which may correspond to polarizing beam splitter 100, includes first and second prisms 210 and 220, and reflective polarizer 230. First prism 210 includes input face 212, output face 214 and first hypotenuse 216. Input face 212 has an input active area 213 and output face 214 has an output active area 215. Lens 240 has largest acceptance area 243. Second prism 220 has an imager face 224 and a second hypotenuse 226. A reflective polarizer 230 is disposed between first and second hypotenuses 216 and 226. The light source 250 produces a light beam having an envelope 252 and a central light ray 256 which defines a folded optical axis 257 having first, second, third and fourth segments, 257a-257d. The first reflective component 232 is disposed adjacent the polarizing beam splitter 200 opposite light source 250 and the second reflective component 234 is disposed adjacent the polarizing beam splitter 200 opposite lens 240.

The second reflective component 234 has a largest active area 236. The second reflective component 234 may be an image forming device and the largest active area 236 may be a largest image area of the image forming device. Light is emitted (by being reflected, for example) from second reflective component 234 in envelope 254. One or both of the first and second reflective components 232 and 234 may have a specular reflectance of greater than 70 percent, or greater than 80 percent, or greater than 90 percent. The first and/or second reflective components 232 and 234 may be flat or may be curved in one or more axes.

In some embodiments, second reflective component 234 is adapted to modulate light incident thereon. For example, second reflective component 234 may be an image forming device that reflects light having a spatially modulated polarization state. Second reflective component 234 may be pixelated and may produce a patterned light. Light reflected from second reflective component 234 in envelope 254 may be converging patterned light. Suitable image forming devices that can be utilized as second reflective component 234 include Liquid Crystal on Silicon (LCoS) devices. The LCoS device may be flat or may be curved in one or more axes.

The various components in FIG. 2 are shown spaced apart for clarity of illustration. However, it should be understood that the various components could be in direct contact or attached through an optically clear adhesive, for example. In some embodiments, reflective polarizer 230 is attached to one or both of first and second prisms 210 and 220 using optically clear adhesive layers. In some embodiments, lens 240 is attached to output face 214 with an optically clear adhesive. In some embodiments, light source 250 may be immediately adjacent input face 212 or may be attached to input face 212 through an optically clear adhesive layer. In some embodiments, first and/or second reflective components 232 and 234 may be attached to second prism 220 with optically clear adhesives.

Folded optical axis 257 includes first segment 257a extending in a first direction (positive x-direction) from the light source 250 to the first reflective component 232, second segment 257b extending in a second direction (negative x-direction) opposite the first direction, third segment 257c extending in a third direction (negative y-direction), and fourth segment 257d extending in a fourth direction (positive y-direction) opposite the third direction. First and second segments 257a and 257b are overlapping though they are shown with a small separation in FIG. 2 for ease of illustration. Similarly, third and fourth segments 257c and 257d are overlapping though they are shown with a small separation in FIG. 2 for ease of illustration. The first and second directions are substantially orthogonal to the third and fourth directions. The first reflective component 232 is substantially perpendicular to the first segment 257a and the second reflective component 234 is substantially perpendicular to the third segment 257c.

Light source 250 produces a light beam having envelope 252 and this defines the input active area 213 as the area of input face 212 that is illumined with light from the light source 250 that is used by the illuminator 202. Light source 250 may either substantially not produce light outside of the envelope 252 or any light that is produced outside this envelope is at an angle that it escapes from the illuminator without entering lens 240.

At least a portion of the light from light source 250 is, in sequence, transmitted through the first prism 210, transmitted through the reflective polarizer 230, transmitted through the second prism 220, reflected from the first reflective component 232, transmitted back through the second prism 220, reflected from the reflective polarizer 230, transmitted through the second prism 220 and is incident on second reflective component 234, reflected from second reflective component 234, transmitted through second prism 220 and reflective polarizer 230 and first prism 210, and finally exits the illuminator through lens 240. This is illustrated in FIG. 2 for central light ray 256. In some embodiments, first reflective component 232 includes a polarization rotator, which may be a quarter wave retarder. Light from the light source 250 that has a polarization along the pass axis of reflective polarizer 230 will be transmitter through the reflective polarizer 230 and then reflect from first reflective component 232 back towards the reflective polarizer 230. In embodiments in which first reflective component 232 includes a quarter wave retarder, such light passes twice through the quarter wave retarder when it reflects back toward the reflective polarizer 230. This light then has a polarization substantially orthogonal to the pass axis of the reflective polarizer 230 and so reflects from the reflective polarizer 230 toward second reflective component 234 which may emit (e.g., reflect) spatially modulated light back toward reflective polarizer 230. The spatially modulated light may have a polarization that is spatially modulated. The portion of the spatially modulated light having a polarization along the pass axis of reflective polarizer 230 will pass through the reflective polarizer 230 as an imaged light, exit first prism 210 through output active area 215 and exit the illuminator through the lens 240.

The illuminator 202 allows an image to be projected by directing a light beam (in envelope 252) through a folded light path illuminator 202 onto an imaging forming device (second reflective component 234), and reflecting a converging patterned light (in envelope 254) from the image forming device. The step of directing a light beam through the folded light path illuminator 202 includes directing light to the first reflective component 232 through the polarizing beam splitter 200, reflecting at least some of the light back towards the polarizing beam splitter 200, and reflecting at least some of the light from the polarizing beam splitter 200 towards the image forming device. At least a portion of the converging patterned light is transmitted through the polarizing beam splitter 200 and through lens 240.

Light from light source 250 illuminates a maximum area of second reflective component 234 after the light is reflected from the first reflective component 232 and the reflective polarizer 230. This maximum area may be equal to the largest active area 236. Alternatively, the largest active area 236 may be a largest area of second reflective component 234 that is reflective. For example, second reflective component 234 may be an image forming device that has a largest image area. Any light incident on the image forming device outside the largest image area may not be reflected towards lens 240. In this case, the largest active area 236 would be the largest image area of the image forming device. The largest active area 236 defines the output active area 215 on output face 214 and largest acceptance area 243 of lens 240 since light is reflected from the largest active area 236 towards lens 240 in envelope 254 which illuminates the output face 214 substantially only in the output active area 215 and illuminates the lens 240 substantially only in the largest acceptance area 243. Illuminator 202 is configured such that light in envelope 254 that is reflected from the second reflective component 234 and that passes through the lens 240 is convergent between the second reflective component 234 and the lens 240. This results in a largest active area 236 that is smaller than the output active area 215 which is smaller than the largest active area 236.

In some embodiments, the input active area 213 and/or the output active area 215 are less than about 60 percent, or less than about 50 percent (i.e., less than about half), or less than about 40 percent, or less than about 35 percent of the largest active area 236, which may be a largest image area. In some embodiments, the largest surface area of input face 212 (the total area of input face 212) is less than about half the largest image area. In some embodiments, the largest surface area of the output face 214 (the total area of output face 214) is less than about half the largest image area.

Light source 250, or any of the light sources of the present description, may include one or more substantially monochromatic light emitting elements. For example, light source 250 may include red, green and blue light emitting diodes (LEDs). Other colors, such as cyan and yellow may also be included. Alternatively, or in addition, broad spectrum (e.g., white or substantially white) light sources may be utilized. In some embodiments, the light source 250 includes a blue emitter and a phosphor. In some embodiments, the light source 250 includes an integrator that may be utilized to combine light from discrete light sources (e.g., the integrator may combine light from red, green and blue LEDs). The light source 250 may include a polarizing element such that light having substantially a single polarization state is directed into first prism 210 towards reflective polarizer 230. In some embodiments, light source 250 may be or may include one or more of an LED, an organic light emitting diode (OLED), a laser, a laser diode, an incandescent lighting element, and an arc lamp. Light source 250 may also include a lens, such as a condenser lens, in addition to lighting emitting element(s) such as LED(s).

Figure 3:
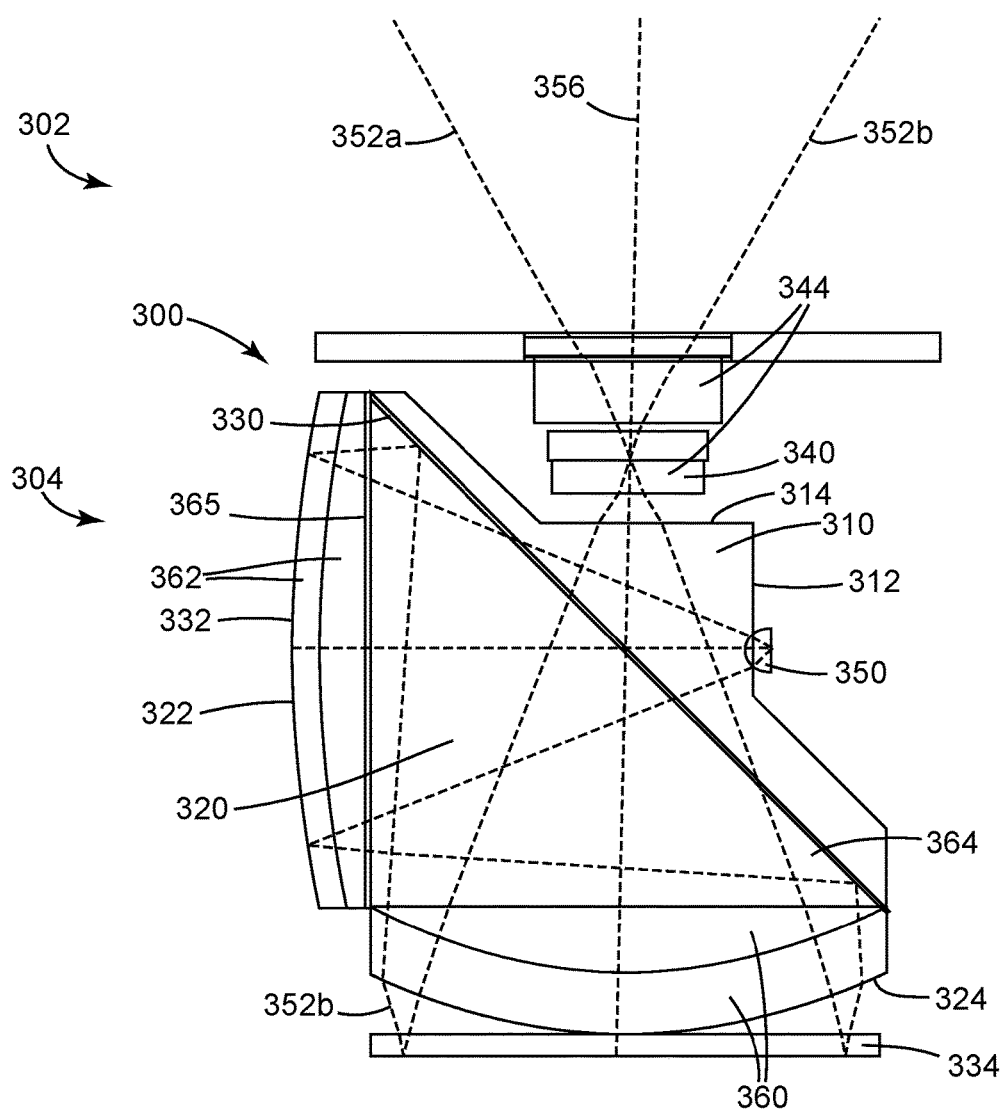
FIG. 3 is a side view of an illuminator.

In some embodiments, the first or second prisms may have one or more curved faces to provide a desired optical power. FIG. 3 is a side view of illuminator 302 including polarizing beam splitting system 304, which includes polarizing beam splitter 300 and first and second reflective components 332 and 334. Illuminator 302 further includes a lens 340, which may be an element of a projection lens 344, and a light source 350. Polarizing beam splitter 300 includes first and second prisms 310 and 320, and reflective polarizer 330. First prism 310 includes input face 312 and output face 314. Second prism 320 has an imager face 324 and a second face 322. A reflective polarizer 330 is disposed between first and second hypotenuses of the first and second prisms 310 and 320.

Second prism 320 includes one or more components 360 and one or more components 362 which may be attached to body 364 of second prism 320 through one or more optically clear adhesives, for example. In some embodiments, components 360 and 362 may be separated (e.g., with an air gap) from body 364. In some embodiments, body 364 may be a right triangular prism. In some embodiments, one or both of components 360 and 362 may be formed integrally with body 364, by injection molding, for example, or by any other suitable forming process. In some embodiments, input face 312 and/or output face 314 may similarly include one or more components with a curved surface(s) attached to a body of the first prism 310 or may include a curved surface formed integrally with first prism 310.

In the illustrated embodiments, first reflective component 332 is a reflective coating applied to second face 322 of second prism 320 and a quarter wave retarder 365 is disposed between body 364 and components 362. In other embodiments, component 362 may be formed integrally with body 364 and a quarter wave retarder may be applied to second face 322 and a reflective coating may then be applied to the quarter wave retarder.

Light source 350 produces central light ray 356 and outer envelope light rays 352a and 352b. Light ray 352b (and similarly for light ray 352a and central light ray 356) is emitted by light source 350 having a polarization along the pass axis of reflective polarizer 330. Light ray 352b, in sequence, passes through first prism 310, pass through reflective polarizer 330, passes through body 364 of second prism 320, passes through quarter wave retarder 365, passes through components 362, is reflected by first reflective component 332, passes back through components 362, and then passes back through quarter wave retarder 365 and back through body 364 towards reflective polarizer 330. Since the light ray 352b has made two passes through the quarter wave retarder, it has a polarization substantially orthogonal to the pass axis of reflective polarizer 330. Light ray 352b therefore reflects from reflective polarizer 330, passes through body 364 and components 360 and is then reflected from second reflective component 334 back through components 360 and body 364 towards reflective polarizer 330. Second reflective component 334 may be an image forming device that spatially modulates the polarization of light reflected from the second reflective component 334. In such cases, a portion of the light reflected from the second reflective component 334 may have a polarization along the pass axis of the reflective polarizer 330. This is the case for light ray 352b which passes through reflective polarizer 330 after reflecting from second reflective component 334. Light ray 352b then passes through first prism 310 and exits through output face 314. Light ray 352b then passes through projection lens 344 and then exits the illuminator 302.

Figure 4A:
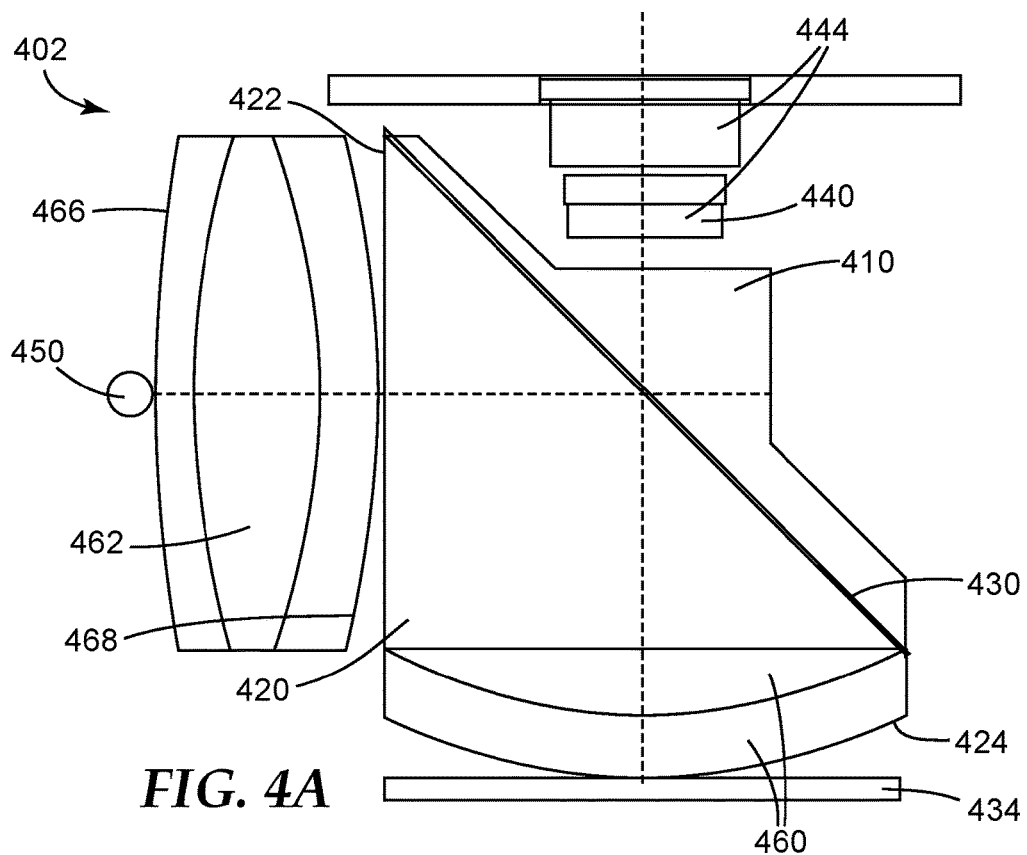
FIG. 4A is a side view of an illuminator.

In some cases it may be useful to have the light source adjacent a larger prism rather than a smaller prism. An exemplary embodiment is illustrated in FIG. 4 which is a side view of illuminator 402 including a first prism 410, a second prism 420, a reflective polarizer 430, a light source 450, a lens 440 which is an element of a projection lens 444, and a lens 462 disposed between light source 450 and face 422 of second prism 420. Second prism 420 also has face 424 and includes components 460 which may be formed integrally with a body of the second prism 420 or may be attached to the body of the second prism 420 with an optically clear adhesive, for example. The lens 462 has a first and second surface 466 and 468, respectively. Light source 450 may correspond to any of the light sources described elsewhere herein.

Figure 4B:
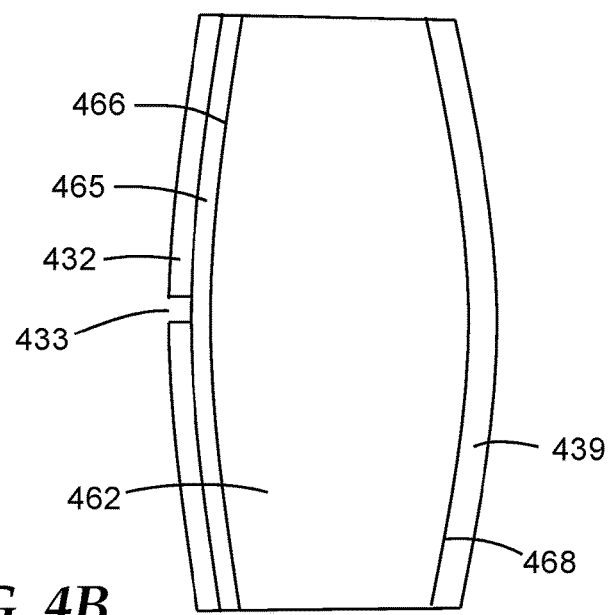
FIG. 4B is a side view of a lens.

In some embodiments, as shown in FIG. 4B, the first surface 466 includes a quarter wave retarder 465 disposed on the first surface 466 and a reflector 432 (e.g., a reflective coating) disposed on the quarter wave retarder 465. In some embodiments, a quarter wave retarder may be disposed adjacent (possibly, but not necessarily immediately adjacent) first surface 466 and a reflector may be disposed adjacent (possibly, but not necessarily immediately adjacent) the quarter wave retarder opposite the first surface 466. The reflector includes an aperture 433 over the emitting face of the light source 450 such that light emitted from the light source 450 passes into the lens 462. The aperture may optionally extend into the quarter wave retarder 465. A reflective polarizer 439 may be attached to the second surface 468. In alternate embodiments, the reflective polarizer 439 may be adjacent but not necessarily immediately adjacent second surface 468.

The arrangement of reflector 432, quarter wave retarder 465 and reflective polarizer 439 provide a polarization converter for light source 450. Light incident on reflective polarizer 439 having a polarization along the pass direction for the reflective polarizer 439 exits lens 462 into second prism 420. Light having the orthogonal polarization is reflected from reflective polarizer 439, passes through the lens 462 and through quarter wave retarder 465, then reflects from reflector 432 and passes back through quarter wave retarder 465 towards reflective polarizer 439. Since the light has made two passes through the quarter wave retarder 465, it now it is polarized along the pass axis of reflective polarizer 439 and so it passes through the reflective polarizer 439 into second prism 420.

Figure 5A:
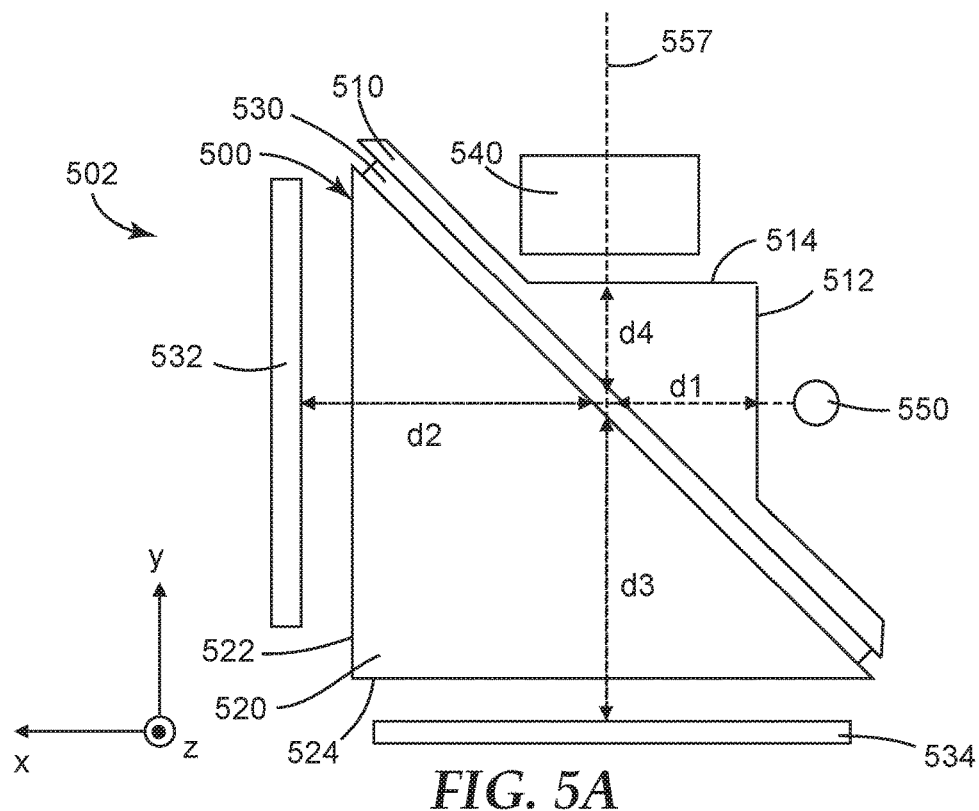
FIGS. 5A-5B are side views of an illuminator.
Figure 5B:
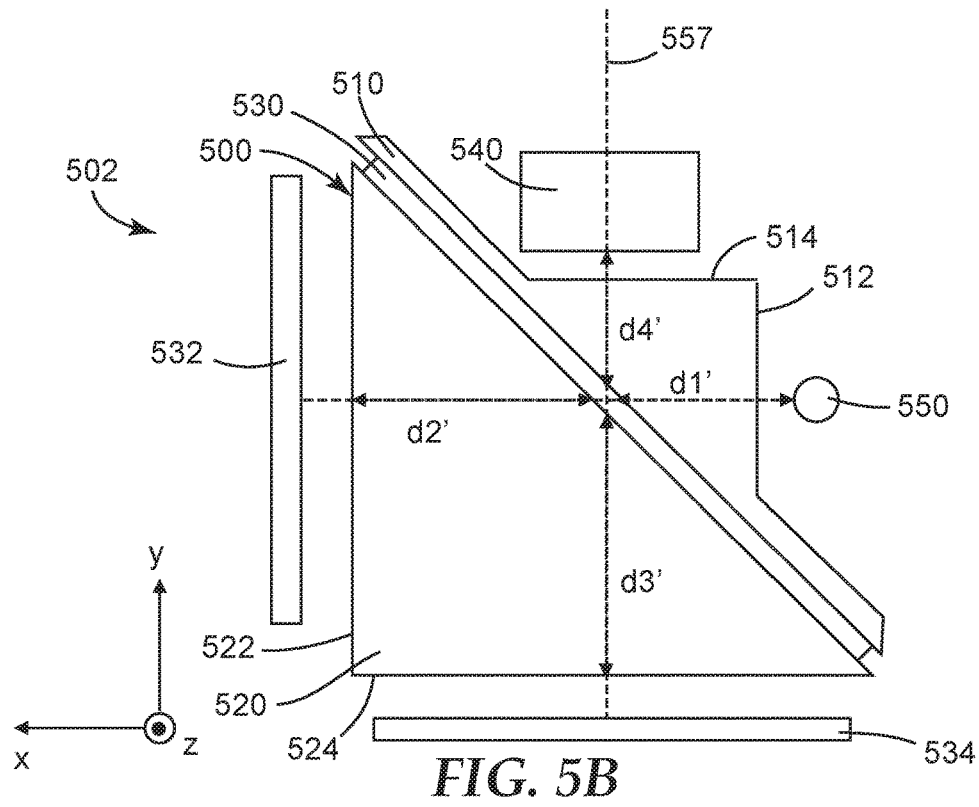

FIGS. 5A and 5B are a side views of illuminator 502 including first and second prisms 510 and 520, a reflective polarizer 530 disposed between hypotenuses of the first and second prisms 510 and 520, first and second reflective components 532 and 534, a lens 540, which may be an element of a projection lens, and a light source 550. First prism 510 includes input surface 512 and output surface 514. Second prism 320 has a first surface 522 and a second surface 524. A central light ray emitted by light source 550 defines a folded optical axis 557 in a similar way that central light ray 256 defines folded optical axis 257. The folded optical axis 557 has a length d1 between the input surface 512 and the reflective polarizer 530, a length d2 between the first reflective component 532 and the reflective polarizer 530, a length d3 between the second reflective component 534 and the reflective polarizer 530, and a length d4 between the output surface 514 and the reflective polarizer 530. In some embodiments, one or both of d1 and d4 are less than the lesser of d2 and d3, or less than 0.9 times the lesser of d2 and d3, or less than 0.85 times the lesser of d2 and d3. In some embodiments, the reflective polarizer 530 has a largest lateral dimension of d5 (described further elsewhere herein) and one or both of d1 and d4 is less than d5/4, or less than 0.2 times d5 or less than 0.15 times d5.

Other lengths that may be useful in describing the geometry of illuminator 502 are illustrated in FIG. 5B. The folded optical axis 557 has a length d1' between the light source 550 and the reflective polarizer 530, a length d2' between second surface 524 and the reflective polarizer 530, a length d3' between first surface 522 and the reflective polarizer 530, and a length d4' between the lens 540 and the reflective polarizer 530. In some embodiments, one or both of d1' and d4' are less than the lesser of d2 and d3, or less than 0.9 times the lesser of d2 and d3, or less than 0.85 times the lesser of d2 and d3. In some embodiments, one or both of d1' and d4' are less than a lesser of d2' and d3', or less than 0.9 times the lesser of d2' and d3', or less than 0.85 times the lesser of d2' and d3'. In some embodiments, the reflective polarizer 530 has a largest lateral dimension of d5 and one or both of d1' and d4' is less than d5/4, or less than 0.2 times d5 or less than 0.15 times d5.

Figure 5C:
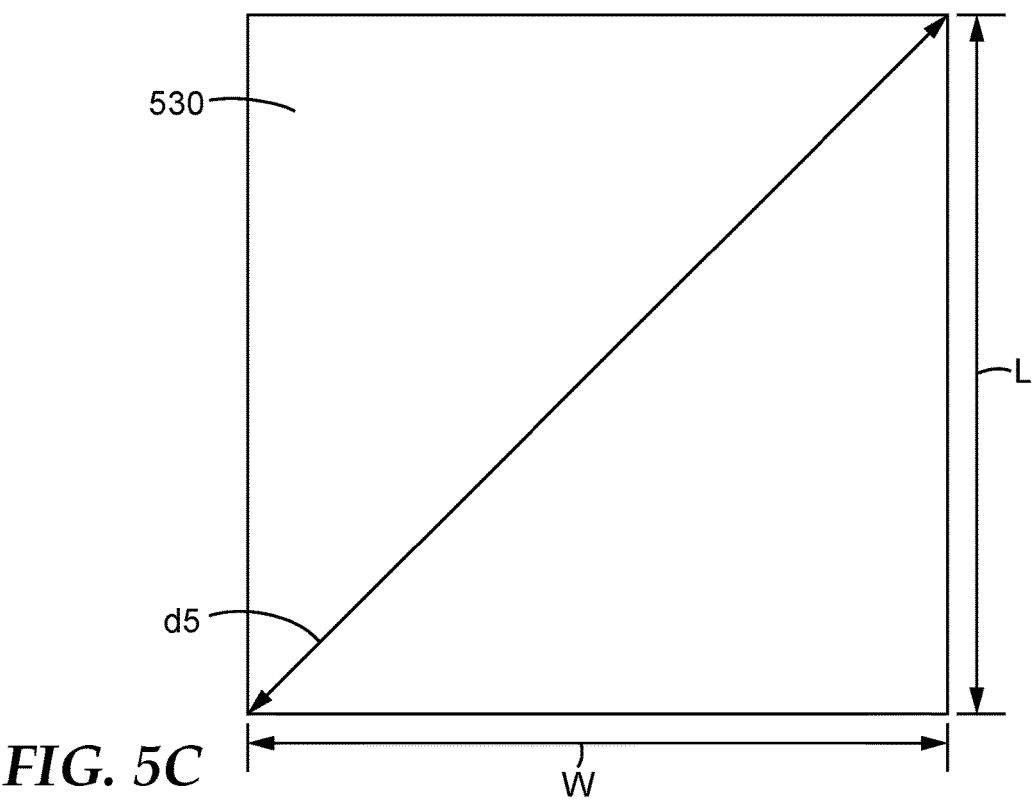
FIG. 5C is a top view of a reflective polarizer.

As illustrated in FIG. 5C, the reflective polarizer 530 may have a largest lateral dimension d5. In cases where the reflective polarizer is rectangular shaped with sides having dimensions L and W, the largest lateral dimension d5 of the reflective polarizer 530 is given by $d5=(L^2+W^2)^{1/2}$. The largest lateral dimension d5 may be greater than four or five times d1 and/or may be greater than four or five times d4. The largest lateral dimension d5 may be greater than four or five times d1' and/or may be greater than four or five times d4'. In some embodiments, the second prism is a right triangular prism and L and W are substantially equal. The lengths d2' and d3' may then be approximately L (or W) divided by $2\sqrt{2}$ and d5 may be approximately equal to four times d2' or approximately equal to four times d3'.

Figure 6:
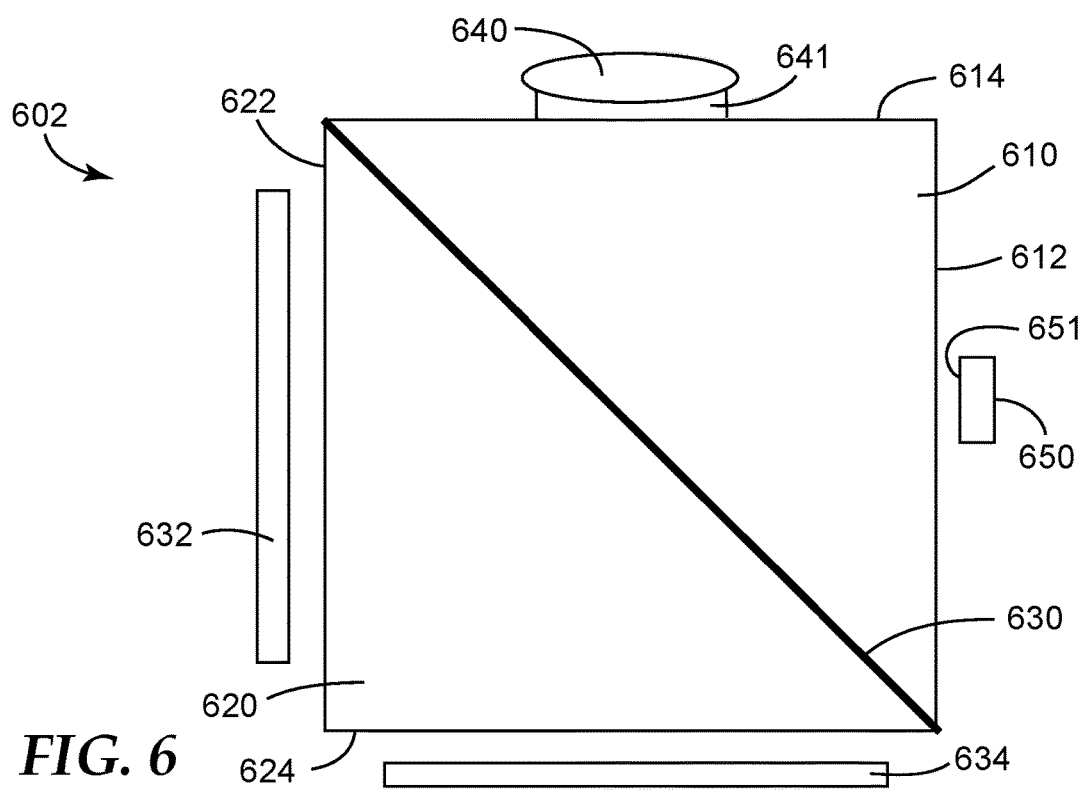
FIG. 6 is a schematic side view of an illuminator.

In some embodiments, the folded optics design allows a first prism to have a substantially smaller volume than a second prism. In other embodiments, the first and second prisms may have substantially the same volume, and the folded optics design may be used with a lens having a small acceptance area and/or with a light source having a small emitting area. This is illustrated in FIG. 6 which is a side view of illuminator 602 including first and second prism 610 and 620, reflective polarizer 630 disposed between the first and second prism 610 and 620, first and second reflective components 632 and 634, and light source 650 having an emitting area 651. First prism 610 includes first and second surfaces 612 and 614, and second prism 620 includes first and second surfaces 622 and 624. Illuminator 602 further includes lens 640 which may optionally be bonded to first prism 610 with an optically clear adhesive layer 641. First reflective component 632 may include a quarter wave retarder as described elsewhere herein, and second reflective component 634 may be an image forming device as described elsewhere herein and may emit a converging patterned light towards lens 640. Emitting area 651 of light source 650 and/or and acceptance area of lens 640 may be less than 60 percent, or less than 50 percent, or less than 40 percent, or less than 35 percent of a largest active area or of a largest image area of second reflective component 634.

Figure 7:
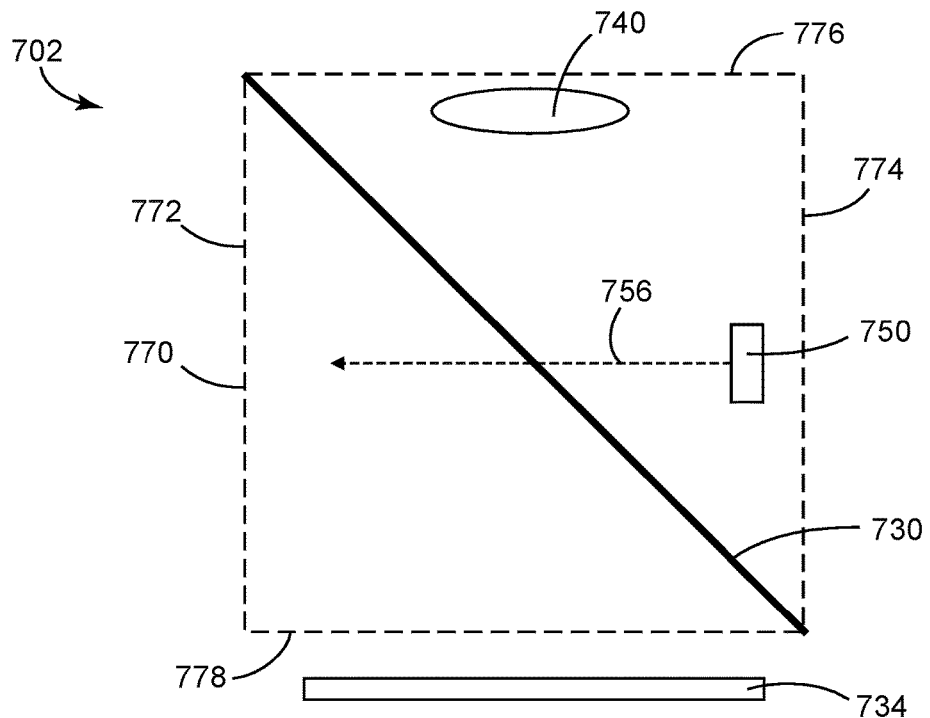
FIG. 7 is a schematic side view of an illuminator.

FIG. 7 is a side view of illuminator 702 including a light source 750, a reflective polarizer 730 in optical communication with the light source 750, and a lens 740 in optical communication with the reflective polarizer. The reflective polarizer 730 defines a smallest imaginary rectangular parallelepiped 770 entirely containing the reflective polarizer 730 and having a surface (surfaces 772 and 774) perpendicular to a central light ray 756 emitted by the light source 750. At least a portion of the light source 750 or at least a portion of the lens 740 is disposed inside the imaginary rectangular parallelepiped 770. In some embodiments, at least a portion of the light source 750 and at least a portion of the lens 740 are disposed inside the imaginary rectangular parallelepiped 770. In some embodiments, all or substantially all of the light source 750 or all or substantially all of the lens 740 is disposed inside the imaginary rectangular parallelepiped 770. In some embodiments, all or substantially all of the light source 750 and all or substantially all of the lens 740 is disposed inside the imaginary rectangular parallelepiped 770.

In some embodiments, lens 740 is an element of a projection lens. In some embodiments, the illuminator 702 also includes an image forming device 734 substantially perpendicular to a surface (surfaces 772 and 774) of the imaginary rectangular parallelepiped 770. In some embodiments, illuminator 702 includes first and/or second prisms, corresponding to the first and second prisms of any of the embodiments described herein, and/or includes a reflective component proximate surface 772 as, for example, shown in any of FIGS. 2-5B.

The illuminators of the present description are useful, for example, when compact projection is desired. In some aspects of the present description, a head mounted system, such as a head mounted display, is provided. Head mounted systems are described, for example, in PCT publication WO 2015/034801 (Ouderkirk) and in U.S. Prov. App. No. 61/977,171 (Ouderkirk et al.), each of which is incorporated herein by reference to the extent that they do not contradict the present description.

Figure 8:
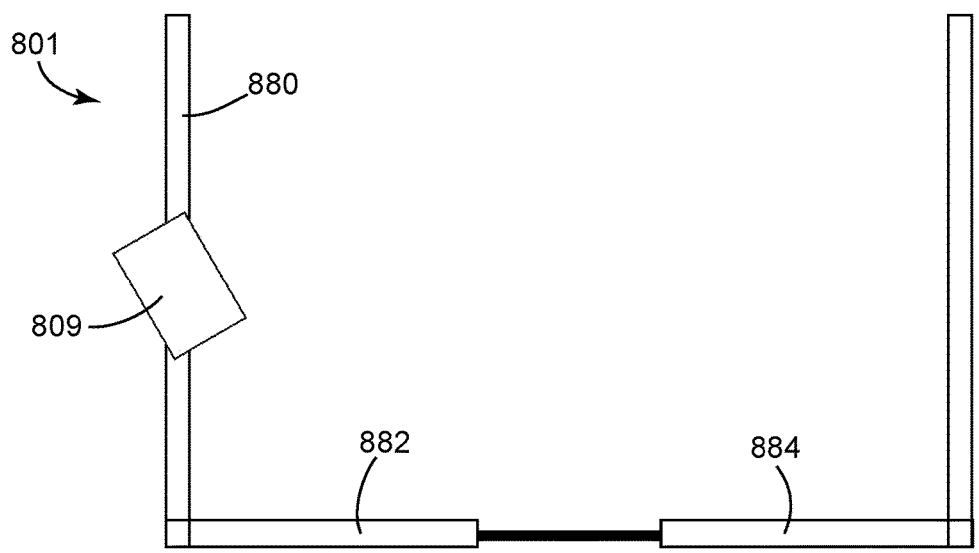
FIG. 8 is a schematic illustration of a head mounted system.

FIG. 8 is a schematic illustration of head mounted system 801 including unit 809 mounted to a frame 880 that includes first and second lenses 882 and 884. Unit 809 is disposed to provide to and/or receive light from first lens 882. In some embodiments, a second unit is mounted to frame 880 to provide to and/or receive light from first lens 882. Unit 809 may be or may include any of the illuminators, polarizing beam splitters, or polarizing beam splitting systems of the present description.

The head mounted system 801 may include an eye monitoring system which may be include in unit 809. The system may monitor the diameter and position of the pupil with an imaging sensor and processor via the first lens 882 positioned in front of the eye. The first lens 882 may include partially transparent reflector either adjacent to or embedded in it, where the reflector produces an image of the pupil on the sensor. The system may quantify fatigue and cognitive processing load of the user of the system based on pupillary response with considerations of ambient light conditions and may be personalized to the user based on historical data. The quantified information may be reported and visualized via a software application, such as a workforce management program or smartphone application.

These attributes of the eye that the eye monitoring system can detect may include one or more of the following: the viewing direction of the eye, diameter and changes in the diameter of the pupil, blinking of the eyelids, the eye tracking objects, and saccade movement. Eye tracking parameters may include velocity of the eye rotation and lag or phase between movement of an object and movement of the eye. Saccade movement may include duration, velocity, and pattern of the movement.

In some embodiments, the head mounted system 801 includes a camera (e.g., a red-green-blue (RGB) camera or an infrared (IR) camera) that may be included in unit 809 and that can capture an image of the eye. An IR camera can be used to determined ambient light conditions since the average IR luminance of the eye image is indicative of the ambient light levels. In some embodiments, the head mounted system 801 is adapted to implement a computer vision algorithm running on an embedded system which may be included in unit 809.

In some embodiments, the head mounted system includes an eye tracking system adapted to detect changes in pupil size and use that information to quantify user fatigue and cognitive processing load. In some embodiments, the head mounted system 801 is adapted (e.g., using an algorithm running on an embedded processor) to implement one or more or all of the following steps:

Step 1: Capture a grayscale image of the eye.

Step 2: Filter out noise (e.g. using a Gaussian filter).

Step 3: Calculate gradient magnitude and direction for each pixel in the image of the eye.

Step 4: Identify pixels with higher gradient magnitudes (these are likely to be an edge of an object).

Step 5: Identify edges by, for example, connecting the pixels identified in the previous step according to the Helmholtz Principle of human visual perception.

Step 6: Compare edge line segments to the equation of an ellipse or other shape defined by a polynomial equation. The smallest ellipse-like shape can be identified as the pupil. The area of the iris can also be determined and may be used to improve accuracy. Other elliptical shapes that may be in the image, such as glint, can be eliminated.

Step 7: Calculate the pupil size (e.g., diameter or area) based on the line fitting done previously and the distance between the eye and the camera.

Step 8: Determine and apply an adjustment factor to the calculated pupil size to account for ambient light conditions. Ambient light conditions can be determined using an additional sensor included in the head mounted system or via luminance analysis of the image captured.

Step 9: Save the adjusted pupil size in a database, which may be a secure database, for historical comparisons and analysis of cognitive processing load and fatigue levels. Such a database could conceivably hold other biological data (such as heart rate, skin conductivity, electroencephalographs (EEGs), etc.) which could be used in a sensor fusion algorithm to further analyze the user's mental state. The pupil size may be recorded as a function of time and may be stored as a time-series (a sequence of data points made over time).

The method of fatigue and cognitive load analysis can utilize historical data to determine if the current levels exceed a threshold. This threshold can vary from person to person and may be determined using a machine learning algorithm once enough historical data has been gathered by the system and procedure described above. If the threshold of fatigue level or cognitive processing load is exceeded, a software application can be utilized to alert the user or a central office manager, for example. Furthermore the historical data (e.g., time-series of pupil diameters) can be visualized (e.g., in a line graph of pupil size over time) in a software application for a quick indication of current cognitive states. The eye tracking system may also track the movement of the eye by storing the location of the pupil in the image captured by the system over time. Including this location of the pupil in the time-series could provide information into how quickly the eye is moving, which provides another way that fatigue could be measured since slower moving eyes are more fatigued than quickly moving eyes.

The following is a list of exemplary embodiments.

Embodiment 1 is an illuminator comprising:
a polarizing beam splitter comprising:
  a first prism having an input face, an output face and a first hypotenuse;
  a second prism having an imager face and a second hypotenuse, the second hypotenuse disposed adjacent the first hypotenuse; and
  a reflective polarizer disposed between the first hypotenuse and the second hypotenuse;
a light source disposed adjacent the input face and defining an input active area on the input face; and
an image forming device disposed adjacent the imager face for receiving light emitted from the light source and emitting a patterned light, the image forming device having a largest image area, the largest image area defining an output active area on the output face;
wherein one or both of the input active area and the output active area are less than about half the largest image area.

Embodiment 2 is the illuminator of embodiment 1, wherein the input active area is less than about half the largest image area.

Embodiment 3 is the illuminator of embodiment 1, wherein the output active area is less than about half the largest image area.

Embodiment 4 is the illuminator of embodiment 1, wherein each of the input active area and the output active area is less than about half the largest image area.

Embodiment 5 is the illuminator of embodiment 1, wherein a largest surface area of input face is less than about half the largest image area.

Embodiment 6 is the illuminator of embodiment 1, wherein a largest surface area of the output face is less than about half the largest image area.

Embodiment 7 is the illuminator of embodiment 1, a largest surface area of input face is less than about half the largest image area, and wherein a largest surface area of the output face is less than about half the largest image area.

Embodiment 8 is the illuminator of embodiment 1, further comprising a reflective component disposed adjacent the polarizing beam splitter opposite the light source.

Embodiment 9 is the illuminator of embodiment 1, wherein the reflective polarizer is a polymeric multilayer reflective polarizer, a wire grid polarizer, a MacNeille reflective polarizer, or a cholesteric reflective polarizer.

Embodiment 10 is the illuminator of embodiment 1, wherein the reflective polarizer is a polymeric multilayer reflective polarizer.

Embodiment 11 is an illuminator comprising:
a polarizing beam splitter,
a first reflective component disposed adjacent a first surface of the polarizing beam splitter, the first reflective component having a largest active area,
a lens disposed adjacent a second surface of the polarizing beam splitter opposite the first surface, the lens receiving light emitted by the first reflective component;

wherein the largest active area defines a largest acceptance area of the lens, and wherein the largest acceptance area is no greater than about half the largest active area.

Embodiment 12 is the illuminator of embodiment 11, wherein the lens is an optical element of a projection lens.

Embodiment 13 is the illuminator of embodiment 11, wherein the lens is bonded to the second surface through an adhesive layer.

Embodiment 14 is the illuminator of embodiment 11, wherein the first reflective component is an image forming device and the largest active area is a largest image area of the image forming device.

Embodiment 15 is the illuminator of embodiment 11, further comprising a light source disposed adjacent a third surface of the polarizing beam splitter, the third surface different from the first and second surfaces.

Embodiment 16 is the illuminator of embodiment 15, wherein the light source defines an input active area on the third surface, the input active area no greater than about half the largest active area.

Embodiment 17 is the illuminator of embodiment 15, further comprising a second reflective component disposed adjacent a fourth surface of the polarizing beam splitter opposite the third surface.

Embodiment 18 is an illuminator comprising a light source, a reflective polarizer in optical communication with the light source, and a lens in optical communication with the reflective polarizer, the reflective polarizer defining a smallest imaginary rectangular parallelepiped entirely containing the reflective polarizer and having a surface perpendicular to a central light ray emitted by the light source, wherein at least a portion of the light source or at least a portion of the lens is disposed inside the imaginary rectangular parallelepiped.

Embodiment 19 is the illuminator of embodiment 18, wherein the lens is an optical element of a projection lens.

Embodiment 20 is the illuminator of embodiment 18, further comprising an image forming device substantially perpendicular to the surface.

Embodiment 21 is the illuminator of embodiment 18, further comprising:
a first prism having first and second faces and having a first hypotenuse, and
a second prism having third and fourth faces and a second hypotenuse, the third face opposite the first face, the fourth face opposite the second face, the reflective polarizer disposed between and adjacent to the first and second hypotenuses.

Embodiment 22 is the illuminator of embodiment 21, wherein the light source is disposed adjacent the first face and the lens is disposed adjacent the second face.

Embodiment 23 is the illuminator of embodiment 21, further comprising an image forming device disposed adjacent the fourth face.

Embodiment 24 is the illuminator of embodiment 21, further comprising a reflective component disposed adjacent the third face.

Embodiment 25 is the illuminator of embodiment 21, wherein one or both of the first and second faces have a largest area that is no greater than about half of a largest area of the fourth face.

Embodiment 26 is a polarizing beam splitter comprising:
a reflective polarizer,
a first prism having a first volume and comprising:
a first face;
a second face adjacent the first face, an angle between the first and second faces substantially equal to 90 degrees;
a first hypotenuse opposite the angle;
a second prism having a second volume, the second prism a right triangular prism having third and fourth faces and having a second hypotenuse, the second hypotenuse disposed adjacent the first hypotenuse, the first the first and second hypotenuses having substantially equal surface areas, the third face opposite the first face and substantially parallel with the first face, the fourth face opposite the second face and substantially parallel with the second face;
wherein the reflective polarizer is disposed between the first and second hypotenuses, and
wherein the first volume is no greater than about half the second volume.

Embodiment 27 is the polarizing beam splitter of embodiment 26, wherein the first face has a largest area that is less than about half of a largest area of the third face and that is less than about half of a largest area of the fourth face.

Embodiment 28 is the polarizing beam splitter of embodiment 26, wherein the second face has a largest area that is less than about half of a largest area of the third face and that is less than about half of a largest area of the fourth face.

Embodiment 29 is the polarizing beam splitter of embodiment 26, wherein the each of a largest area of the first face and a largest area of the second face is less than about half of a lesser of a largest area of the third face and a largest area of the fourth face.

Embodiment 30 is the polarizing beam splitter of embodiment 26, further comprising a portion extending from the first and second sides, wherein the first hypotenuse comprises a major surface of the portion.

Embodiment 31 is a polarizing beam splitting system adapted to receive light from a light source and centered on a folded optical axis defined by an optical path of a central light ray emitted by the light source, the polarizing beam splitting system comprising:
an input surface substantially perpendicular to the optical axis, light entering the polarizing beam splitting system by passing through the input surface;
a reflective polarizer, the optical axis having a length d1 between the input surface and the reflective polarizer;
a first reflective component substantially perpendicular to the optical axis, the optical axis having a length d2 between the first reflective component and the reflective polarizer;
a second reflective component substantially perpendicular to the optical axis, the optical axis having a length d3 between the second reflective component and the reflective polarizer; and
an output face substantially perpendicular to the optical axis, light exiting the polarizing beam splitting system by passing through the output surface, the optical axis having a length d4 between the output surface and the reflective polarizer, one or both of d1 and d4 being less than a lesser of d2 and d3.

Embodiment 32 is the polarizing beam splitting system of embodiment 31, wherein d4 is less than the lesser of d2 and d3.

Embodiment 33 is the polarizing beam splitting system of embodiment 31, wherein d1 is less than the lesser of d2 and d3.

Embodiment 34 is the polarizing beam splitting system of embodiment 31, wherein both d1 and d4 are less than the lesser of d2 and d3.

Embodiment 35 is the polarizing beam splitting system of embodiment 31, wherein one or both of d1 and d4 less than 0.9 times the lesser of d2 and d3.

Embodiment 36 is the polarizing beam splitting system of embodiment 31, wherein the reflective polarizer has a largest lateral dimension of d5, one or both of d1 and d4 being less than d5/4.

Embodiment 37 is the polarizing beam splitting system of embodiment 36, wherein each of d1 and d4 is less than d5/4.

Embodiment 38 is the polarizing beam splitting system of embodiment 36, wherein one or both of d1 and d4 is less than 0.2 times d5.

Embodiment 39 is the polarizing beam splitting system of embodiment 31, wherein the second reflective component is adapted to modulate light incident thereon.

Embodiment 40 is the polarizing beam splitting system of embodiment 31, wherein the second reflective component is pixelated.

Embodiment 41 is the polarizing beam splitting system of embodiment 31, wherein an angle between the reflective polarizer and the optical axis is between about 40 to 60 degrees.

Embodiment 42 is the polarizing beam splitting system of embodiment 31, wherein the first reflective component has a specular reflectance greater than about 80%.

Embodiment 43 is the polarizing beam splitting system of embodiment 31, wherein the second reflective component has a specular reflectance greater than about 80%.

Embodiment 44 is a polarizing beam splitting system adapted to receive light from a light source and centered on a folded optical axis defined by an optical path of a central light ray emitted by the light source, the polarizing beam splitting system comprising:
an input surface substantially perpendicular to the optical axis, light entering the polarizing beam splitting system by passing through the input surface;
a reflective polarizer having a largest lateral dimension d5, the optical axis having a length d1 between the input surface and the reflective polarizer;
a first reflective component substantially perpendicular to the optical axis, the optical axis having a length d2 between the first reflective component and the reflective polarizer;
a second reflective component substantially perpendicular to the optical axis, the optical axis having a length d3 between the second reflective component and the reflective polarizer; and
an output face substantially perpendicular to the optical axis, light exiting the polarizing beam splitting system by passing through the output surface, the optical axis having a length d4 between the output surface and the reflective polarizer,
wherein one or both of d1 and d4 are less than d5/4.

Embodiment 45 is the polarizing beam splitting system of embodiment 44, wherein d1 is less than d5/4.

Embodiment 46 is the polarizing beam splitting system of embodiment 44, wherein d4 is less than d5/4.

Embodiment 47 is the polarizing beam splitting system of embodiment 44, wherein each of d1 and d4 is less than d5/4.

Embodiment 48 is the polarizing beam splitting system of embodiment 44, wherein one or both of d1 and d4 are less than 0.2 times d5.

Embodiment 49 is the polarizing beam splitting system of embodiment 44, wherein one or both of d1 and d4 are less than a lesser of d2 and d3.

Embodiment 50 is the polarizing beam splitting system of embodiment 49, wherein d1 is less than the lesser of d2 and d3.

Embodiment 51 is the polarizing beam splitting system of embodiment 49, wherein d4 is less than the lesser of d2 and d3.

Embodiment 52 is the polarizing beam splitting system of embodiment 49, wherein each of d1 and d4 is less than the lesser of d2 and d3.

Embodiment 53 is the polarizing beam splitting system of embodiment 52, wherein each of d1 and d4 is less than 0.9 times the lesser of d2 and d3.

Embodiment 54 is the polarizing beam splitting system of embodiment 44, wherein the first reflective component has a specular reflectance greater than about 80%.

Embodiment 55 is the polarizing beam splitting system of embodiment 44, wherein the second reflective component has a specular reflectance greater than about 80%.

Embodiment 56 is an illuminator comprising a light source, a lens, and a polarizing beam splitting system adapted to receive light from the light source and output light through the lens, the polarizing beam splitting system centered on a folded optical axis defined by an optical path of a central light ray emitted by the light source, the polarizing beam splitting system comprising:
a reflective polarizer, the optical axis having a length d1 between the light source and the reflective polarizer;
a first reflective component substantially perpendicular to the optical axis and disposed proximate the reflective polarizer opposite the light source, the optical axis having a length d2 between the first reflective component and the reflective polarizer;
a second reflective component substantially perpendicular to the optical axis and disposed proximate the reflective polarizer opposite the lens, the optical axis having a length d3 between the second reflective component and the reflective polarizer,
wherein the optical axis has a length d4 between the lens and the reflective polarizer and one or both of d1 and d4 are less than a lesser of d2 and d3.

Embodiment 57 is the illuminator of embodiment 56, wherein d4 is less than the lesser of d2 and d3.

Embodiment 58 is the illuminator of embodiment 56, wherein d1 is less than the lesser of d2 and d3.

Embodiment 59 is the illuminator of embodiment 56, wherein both d1 and d4 are less than the lesser of d2 and d3.

Embodiment 60 is the illuminator of embodiment 56, wherein one or both of d1 and d4 are less than 0.9 times the lesser of d2 and d3.

Embodiment 61 is the illuminator of embodiment 56, wherein the reflective polarizer has a largest lateral dimension of d5, one or both of d1 and d4 being less than d5/4.

Embodiment 62 is the illuminator of embodiment 61, wherein each of d1 and d4 is less than d5/4.

Embodiment 63 is the illuminator of embodiment 61, wherein one or both of d1 and d4 is less than 0.2 times d5.

Embodiment 64 is the illuminator of embodiment 56, wherein the second reflective component is adapted to modulate light incident thereon.

Embodiment 65 is the illuminator of embodiment 56, wherein the second reflective component is pixelated.

Embodiment 66 is the illuminator of embodiment 56, wherein an angle between the reflective polarizer and the optical axis is between about 40 to 60 degrees.

Embodiment 67 is the illuminator of embodiment 56, wherein the first reflective component has a specular reflectance greater than about 80%.

Embodiment 68 is the illuminator of embodiment 56, wherein the second reflective component has a specular reflectance greater than about 80%.

Embodiment 69 is an illuminator comprising a light source, a lens, and a polarizing beam splitting system adapted to receive light from the light source and output light through the lens, the polarizing beam splitting system centered on a folded optical axis defined by an optical path of a central light ray emitted by the light source, the polarizing beam splitting system comprising:
a reflective polarizer having a largest lateral dimension d5, the optical axis having a length d1 between the light source and the reflective polarizer;
a first reflective component substantially perpendicular to the optical axis and disposed proximate the reflective polarizer opposite the light source, the optical axis having a length d2 between the first reflective component and the reflective polarizer;
a second reflective component substantially perpendicular to the optical axis and disposed proximate the reflective polarizer opposite the lens, the optical axis having a length d3 between the second reflective component and the reflective polarizer,
wherein the optical axis has a length d4 between the lens and the reflective polarizer, and one or both of d1 and d4 are less than d5/4.

Embodiment 70 is the illuminator of embodiment 69, wherein d1 is less than d5/4.

Embodiment 71 is the illuminator of embodiment 69, wherein d4 is less than d5/4.

Embodiment 72 is the illuminator of embodiment 69, wherein each of d1 and d4 is less than d5/4.

Embodiment 73 is the illuminator of embodiment 69, wherein one or both of d1 and d4 are less than 0.2 times d5.

Embodiment 74 is the illuminator of embodiment 69, wherein one or both of d1 and d4 are less than a lesser of d2 and d3.

Embodiment 75 is the illuminator of embodiment 74, wherein d1 is less than the lesser of d2 and d3.

Embodiment 76 is the illuminator of embodiment 74, wherein d4 is less than the lesser of d2 and d3.

Embodiment 77 is the illuminator of embodiment 74, wherein each of d1 and d4 is less than the lesser of d2 and d3.

Embodiment 78 is the illuminator of embodiment 74, wherein each of d1 and d4 is less than 0.9 times the lesser of d2 and d3.

Embodiment 79 is the illuminator of embodiment 69, wherein the first reflective component has a specular reflectance greater than about 80%.

Embodiment 80 is the illuminator of embodiment 69, wherein the second reflective component has a specular reflectance greater than about 80%.

Embodiment 81 is an illuminator comprising a light source, a reflective polarizer, a first reflective component, a second reflective component and a lens, the illuminator configured such that a central light ray emitted by the light source sequentially passes through the reflective polarizer, reflects from the first reflective component back toward the reflective polarizer, reflects from the reflective polarizer towards the second reflective component, reflects from the second reflective component back towards the reflective polarizer, passes through the reflective polarizer and then exits the illuminator through the lens.

Embodiment 82 is the illuminator of embodiment 81 configured such that light that is reflected from the second reflective component and that passes through the lens is convergent between the second reflective component and the lens.

Embodiment 83 is the illuminator of embodiment 81, wherein the second reflective component is adapted to modulate light incident thereon.

Embodiment 84 is the illuminator of embodiment 81, wherein the second reflective component is pixelated.

Embodiment 85 is the illuminator of embodiment 81, wherein the first reflective component has a specular reflectance greater than about 80%.

Embodiment 86 is the illuminator of embodiment 81, wherein the second reflective component has a specular reflectance greater than about 80%.

Embodiment 87 is a polarizing beam splitting system comprising a reflective polarizer and having a folded optical axis defined by an optical path of a central light ray emitted by a light source towards the reflective polarizer, the folded optical axis comprising:
overlapping first and second segments, the optical path along the first segment having a first direction, the optical path along the second segment having a second direction opposite to the first direction; and
overlapping third and fourth segments, the optical path along the third segment having a third direction, the optical path along the fourth segment having a fourth direction opposite to the third direction,
wherein the first direction and the third direction are substantially orthogonal.

Embodiment 88 is the polarizing beam splitting system of embodiment 87, further comprising a first reflective component substantially perpendicular to the first segment and a second reflective component substantially perpendicular to the third segment.

Embodiment 89 is the polarizing beam splitting system of embodiment 88, wherein the second reflective component is adapted to modulate light incident thereon.

Embodiment 90 is the polarizing beam splitting system of embodiment 88, wherein the second reflective component is pixelated.

Embodiment 91 is the polarizing beam splitting system of embodiment 88, wherein the first reflective component has a specular reflectance greater than about 80%.

Embodiment 92 is the polarizing beam splitting system of embodiment 88, wherein the second reflective component has a specular reflectance greater than about 80%.

Embodiment 93 is the polarizing beam splitting system of embodiment 88 further comprising first and second prisms, the reflective polarizer disposed between a hypotenuse of the first prism and a hypotenuse of the second prism, the first reflective component adjacent a first face of the second prism, the second reflective component adjacent a second face of the second prism.

Embodiment 94 is the polarizing beam splitting system of embodiment 93, wherein a volume of the first prism is no greater than half a volume of the second prism.

Embodiment 95 is a method of projecting an image comprising:
directing light to a reflective component through a polarizing beam splitter;
reflecting at least some of the light back towards the polarizing beam splitter;
reflecting at least some of the light from the polarizing beam splitter towards an image forming device; and
reflecting at least some of the light from the image forming device as a converging patterned light.

Embodiment 96 is the method of embodiment 95, further comprising transmitting at least some of the converging patterned light through the polarizing beam splitter.

Embodiment 97 is the method of embodiment 96, further comprising transmitting at least some of the converging patterned light through a lens.

Embodiment 98 is a method of projecting an image comprising:
directing a light beam through a folded light path illuminator onto an imaging forming device, and
reflecting a converging patterned light from the image forming device.

Embodiment 99 is the method of embodiment 98, wherein the folded light path illuminator comprises a light source, a reflective polarizer, a reflective component and a lens, the illuminator configured such that a central light ray emitted by the light source sequentially passes through the reflective polarizer, reflects from the reflective component back toward the reflective polarizer, reflects from the reflective polarizer towards the image forming device, reflects from the image forming device back towards the reflective polarizer, passes through the reflective polarizer and then exits the illuminator through the lens.

Embodiment 100 is the method of embodiment 98, wherein the directing a light beam step comprises:
directing light to a reflective component through a polarizing beam splitter;
reflecting at least some of the light back towards the polarizing beam splitter; and
reflecting at least some of the light from the polarizing beam splitter towards the image forming device.

Embodiment 101 is a head mounted system comprising the illuminator of any of the previous embodiments directed to illuminators, or comprising the polarizing beam splitting system of any of the previous embodiments directed to polarizing beam splitting systems, or comprising the polarizing beam splitter of any of the previous embodiments directed to polarizing beam splitters.

Embodiment 102 is the head mounted system of embodiment 101 further comprising an eye tracking system.

Embodiment 103 is the head mounted system of embodiment 102, wherein the eye tracking system is adapted to determine pupil size.

Embodiment 104 is the head mounted system of embodiment 103, wherein the eye tracking system is adapted to record a time-series of pupil diameters.

Embodiment 105 is the head mounted system of embodiment 104, wherein the eye tracking system is adapted to record a time-series of pupil locations.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An illuminator comprising:
a polarizing beam splitter comprising:
a first prism having an input face, an output face and a first hypotenuse;
a second prism having an imager face and a second hypotenuse, the second hypotenuse disposed adjacent the first hypotenuse; and
a reflective polarizer disposed between the first hypotenuse and the second hypotenuse;
a light source disposed adjacent the input face and defining an input active area on the input face; and
an image forming device disposed adjacent the imager face for receiving light emitted from the light source and emitting a patterned light, the image forming device having a largest image area, the largest image area defining an output active area on the output face;
wherein one or both of the input active area and the output active area are less than about half the largest image area.

2. The illuminator of claim 1, wherein the input active area is less than about half of the largest image area.

3. The illuminator of claim 1, wherein the output active area is less than about half the largest image area.

4. The illuminator of claim 1, wherein each of the input active area and the output active area is less than about half the largest image area.

5. The illuminator of claim 1, wherein a largest surface area of input face is less than about half the largest image area.

6. The illuminator of claim 1, wherein a largest surface area of the output face is less than about half the largest image area.

7. An illuminator comprising:
a polarizing beam splitter,
a first reflective component disposed adjacent a first surface of the polarizing beam splitter, the first reflective component having a largest active area,
a lens disposed adjacent a second surface of the polarizing beam splitter opposite the first surface, the lens receiving light emitted by the first reflective component;
wherein the largest active area defines a largest acceptance area of the lens, and wherein the largest acceptance area is no greater than about half the largest active area.

8. The illuminator of claim 7, wherein the lens is bonded to the second surface through an adhesive layer.

9. The illuminator of claim 7, further comprising a light source disposed adjacent a third surface of the polarizing beam splitter, the third surface different from the first and second surfaces.

10. The illuminator of claim 9, wherein the light source defines an input active area on the third surface, the input active area no greater than about half the largest active area.

11. A polarizing beam splitter comprising:
a reflective polarizer,
a first prism having a first volume and comprising:
a first face;
a second face adjacent the first face, an angle between the first and second faces substantially equal to 90 degrees;
a first hypotenuse opposite the angle;
a second prism having a second volume, the second prism a right triangular prism having third and fourth faces and having a second hypotenuse, the second hypotenuse disposed adjacent the first hypotenuse, the first and second hypotenuses having substantially equal surface areas, the third face opposite the first face and substantially parallel with the first face, the fourth face opposite the second face and substantially parallel with the second face;
wherein the reflective polarizer is disposed between the first and second hypotenuses, and
wherein the first volume is no greater than about half the second volume.

12. The polarizing beam splitter of claim 11, wherein the first face has a largest area that is less than about half of a largest area of the third face and that is less than about half of a largest area of the fourth face.

13. The polarizing beam splitter of claim 11, wherein the second face has a largest area that is less than about half of a largest area of the third face and that is less than about half of a largest area of the fourth face.

14. The polarizing beam splitter of claim 11, wherein the first prism further comprises a portion extending from the first and second faces, wherein the first hypotenuse comprises a major surface of the portion.

15. An illuminator comprising a light source, a lens, and a polarizing beam splitting system adapted to receive light from the light source and output light through the lens, the polarizing beam splitting system centered on a folded optical axis defined by an optical path of a central light ray emitted by the light source, the polarizing beam splitting system comprising: a reflective polarizer disposed between a first hypotenuse of a first prism and a second hypotenuse of a second prism, the first and second hypotenuses having substantially equal surface areas, the optical axis having a length d1 between the light source and the reflective polarizer;
a first reflective component substantially perpendicular to the optical axis and disposed proximate a first face of the second prism such that the reflective polarizer is disposed between the first reflective component and the light source, the optical axis having a length d2 between the first face of the second prism and the reflective polarizer;
a second reflective component substantially perpendicular to the optical axis and disposed proximate a second face of the second prism such that the reflective polarizer is disposed between the second reflective component and the lens, the optical axis having a length d3 between the second face of the second prism and the reflective polarizer,
wherein the optical axis has a length d4 between the lens and the reflective polarizer and one or both of d1 and d4 are less than a lesser of d2 and d3.

16. The illuminator of claim 15, wherein d4 is less than the lesser of d2 and d3.

17. The illuminator of claim 15, wherein d1 is less than the lesser of d2 and d3.

18. The illuminator of claim 15, wherein both d1 and d4 are less than the lesser of d2 and d3.

19. The illuminator of claim 15, wherein one or both of d1 and d4 are less than 0.9 times the lesser of d2 and d3.

20. The illuminator of claim 15, wherein the reflective polarizer has a largest lateral dimension of d5, one or both of d1 and d4 being less than d5/4.

21. An illuminator comprising a light source, a lens, and a polarizing beam splitting system adapted to receive light from the light source and output light through the lens, the polarizing beam splitting system centered on a folded optical axis defined by an optical path of a central light ray emitted by the light source, the polarizing beam splitting system comprising: a reflective polarizer defining a smallest imaginary rectangular parallelepiped entirely containing the reflective polarizer and having a surface perpendicular to the central ray;
a first reflective component substantially perpendicular to the optical axis and disposed proximate the reflective polarizer opposite the light source;
a second reflective component substantially perpendicular to the optical axis and disposed proximate the reflective polarizer opposite the lens,
wherein at least a portion of the light source or at least a portion of the lens is disposed inside the smallest imaginary rectangular parallelepiped.

22. The illuminator of claim 21, wherein the reflective polarizer has a largest lateral dimension d5, and the optical axis has a length d1 between the light source and the reflective polarizer, d1 being less than d5/4.

23. The illuminator of claim 21, wherein the reflective polarizer has a largest lateral dimension d5, and the optical axis has a length d4 between the lens and the reflective polarizer, d4 being less than d5/4.

24. The illuminator of claim 21, wherein the reflective polarizer has a largest lateral dimension d5, the optical axis has a length d1 between the light source and the reflective polarizer, and the optical axis has a length d4 between the lens and the reflective polarizer, each of d1 and d4 being less than d5/4.

25. The illuminator of claim 21, wherein the reflective polarizer has a largest lateral dimension d5, the optical axis has a length d1 between the light source and the reflective polarizer, and the optical axis has a length d4 between the lens and the reflective polarizer, one or both of d1 and d4 being less than 0.2 times d5.

26. The illuminator of claim 21, wherein at least a portion of the light source and at least a portion of the lens are disposed inside the smallest imaginary rectangular parallelepiped.

27. A head mounted system comprising the illuminator of claim 21 and an eye tracking system proximate the illuminator, the eye tracking system adapted to record a time-series of pupil diameters and a time-series of pupil locations.

* * * * *